United States Patent
Uno et al.

(10) Patent No.: US 7,639,586 B2
(45) Date of Patent: Dec. 29, 2009

(54) HOLOGRAM RECORDING MEDIUM AND HOLOGRAM RECORD-REPRODUCTION DEVICE

(75) Inventors: Kazushi Uno, Kawasaki (JP); Kouichi Tezuka, Kawasaki (JP); Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 460 days.

(21) Appl. No.: 11/182,265

(22) Filed: Jul. 15, 2005

(65) Prior Publication Data

US 2006/0114792 A1    Jun. 1, 2006

(30) Foreign Application Priority Data

Nov. 30, 2004    (JP) ............................. 2004-347800

(51) Int. Cl.
*G11B 7/00*    (2006.01)
(52) U.S. Cl. ....................................... 369/103
(58) Field of Classification Search .................. 369/103
See application file for complete search history.

(56) References Cited

U.S. PATENT DOCUMENTS

| | | | | |
|---|---|---|---|---|
| 6,995,896 | B2 * | 2/2006 | Yamabana et al. | 359/291 |
| 7,031,038 | B2 * | 4/2006 | Ogasawara et al. | 359/22 |
| 7,116,626 | B1 * | 10/2006 | Woods et al. | 369/103 |
| 7,206,108 | B2 * | 4/2007 | Tsukagoshi | 359/35 |
| 7,327,602 | B2 * | 2/2008 | Kostylev et al. | 365/163 |
| 7,545,723 | B2 * | 6/2009 | Tsukagoshi et al. | 369/103 |
| 2002/0041561 | A1 * | 4/2002 | Tsukamoto et al. | 369/103 |
| 2002/0075776 | A1 | 6/2002 | Kasazumi et al. | |

FOREIGN PATENT DOCUMENTS

| | | |
|---|---|---|
| JP | 11-016374 | 1/1999 |
| JP | 2002-216359 | 8/2002 |

OTHER PUBLICATIONS

IEEE Standards 802.11F IEEE *Trial-Use Recommended Practice for Milti-Vendor Access Point. Interoperability bia an Inter-Access Point Protocol Acrodd Distribution Systems Supporting IEEE 802.11 Operation*, IEEE Computer Society, The Institute of Electrical and Electronics Engineers, Inc., Jul. 14, 2003.

* cited by examiner

*Primary Examiner*—Joseph H Feild
*Assistant Examiner*—Joseph Haley
(74) *Attorney, Agent, or Firm*—Fujitsu Patent Center

(57) ABSTRACT

A disk-type hologram recording medium and a hologram recording and reproduction device utilizing such a recording medium are provided. The hologram recording and reproduction device includes a spatial optical modulator provided with a plurality of optical elements arranged in a grid-like form. These optical elements are divided into groups each associated with 1 bit of data for performing required light modulation. Thus, a special pattern exhibiting a greater S/N margin for 1 bit can be recorded in the recoding medium. During data recording or data reproduction, the special pattern is read from the recording medium, and based on the retrieved special pattern, fine adjustment by servo control is conducted for adjustment of tilting or focusing of the recording medium and for adjustment of the wavelength of the light emitted from the light source.

1 Claim, 17 Drawing Sheets

Area Corresponding to 1 Bit
(Four-Pixel Section)

HOLOGRAM RECORDING MEDIUM AND HOLOGRAM RECORD-REPRODUCTION DEVICE

BACKGROUND OF THE INVENTION

1. Field of the Invention

The present invention relates to a hologram recording medium and a hologram record-reproduction device using a principle of holography.

2. Description of the Related Art

A hologram recording and reproducing apparatus is known in which a laser beam is divided into two, one of them is modulated with information that is to be recorded with a spatial optical modulator and this information beam is caused to fall on an optical recording medium (referred to hereinbelow as a hologram recording medium) having a recording layer of a hologram substance (referred to hereinbelow as a hologram recording layer), whereas the other beam is caused to fall as a reference beam at the prescribed angle of incidence with respect to the information beam in an information beam illumination position on the hologram recording layer of the hologram (interference pattern) recording medium and the hologram generated by the information beam and reference beam is recorded on the hologram recording layer.

With the hologram recording method, a plurality of holograms can be recorded (angular multiplex recording) in the same recording position of the hologram recording medium by changing the angle of incidence of the reference beam. Therefore, the capacity which is more than several tens of times greater than that of the CD (Compact Disc) or DVD (Digital Versatile Disc) can be recorded and reproduced with the hologram recording and reproduction suggested in prior art.

Further, in the above-described hologram recording and reproduction device, a diffraction beam (information beam) is generated from the hologram medium by causing he reference beam to fall at the same angle and phase-map of incidence as during recording on the hologram recording medium, this diffraction beam is received with a pickup element, and the desired information is reproduced by conducting the prescribed signal processing of the received optical signal.

The hologram recording system enables large-capacity recording by angular multiplex recording, but when the diffraction beam (information beam) is generated by causing the reference beam to fall on the hologram recorded on the hologram recording medium, the intensity (diffraction efficiency) of the diffraction beam is known to follow the second power distribution of a sinc function, as shown in FIG. 19, and the specific feature of such a process is that the allowed range (margin) of both the shift of the angle $\theta$ of incidence of the reference beam during recording and reproduction and the shift of the wavelength $\lambda$ of the light source are very narrow (angular selectivity and wavelength selectivity are extremely high).

In FIG. 19, the intensity of the diffraction beam (a value normalized with respect to a maximum value taken as "1.0") is plotted against the ordinate, and the shift quantity $\Delta\theta$ of the angle of incidence of the reference beam or the shift quantity $\Delta\lambda$ of the wavelength of the light source is plotted against the abscissa. The position "0" on the abscissa is the position in which the angle of incidence of the reference beam or the wavelength of the light source match those during recording and in which the shift is zero. At this time, the intensity of the diffraction beam assumes a maximum value. When the shift quantity $\Delta\theta$ of the angle of incidence of the reference beam is plotted against the abscissa, FIG. 19 shows the relationship between the intensity of the diffraction beam and the shift quantity $\Delta\theta$ of the angle of incidence of the reference beam, and when the shift quantity $\Delta\lambda$ of the wavelength of the light source is plotted against the abscissa, FIG. 19 shows the relationship between the intensity of the diffraction beam and the shift quantity $\Delta\lambda$ of the wavelength of the light source.

For example, when recording is conducted on a hologram recording medium with a thickness of the hologram substance of 200 µm by using a laser beam with a wavelength of the light source of 405 nm at an angle of incidence of the reference beam of 30°, then the shift quantity $\Delta\lambda$ of the wavelength of the light source in point (a) and point (b) in which the intensity of the diffraction beam is "0" will be about ±6.1 nm and the shift quantity $\Delta\theta$ the angle of incidence of the reference beam will be about ±7 min. Therefore, if the margin of the diffraction beam decrease during reproduction of information recorded on the hologram recording medium is taken as "0.5" (3 dB down), then the shift quantity $\Delta\lambda_{3dB}$ (shift quantity $\Delta\lambda$ of 3 dB down) of the wavelength of the light source at which the intensity of the diffraction beam becomes "0.5" is about ±3 nm and this value becomes the margin for the shift of the wavelength of the light source. Furthermore, the angle of incidence $\Delta\theta_{3dB}$ of the reference beam at which the intensity of the diffraction beam becomes "0.5" is about ±3.5 minutes and this value becomes the margin for the shift of the angle of incidence of the reference beam.

Thus, with the hologram recording method, the margins for the shift of the wavelength of the light source and the shift of the angle of incidence of the reference beam are extremely narrow (severe conditions relating to angle selectivity or wavelength selectivity). Therefore, because of such conditions it is difficult to realize a replaceable and portable hologram recording medium that uses optical disks such as CD or DVD.

Accordingly, a technology for increasing the stability and reliability of recording and reproduction by improving methods for recording information on a hologram recording medium have been heretofore suggested.

For example, Japanese Patent Application Laid-open No. H11-16374 describes a hologram recording method by which the decrease in diffraction efficiency of information beam is reduced as much as possible and reliability of reproduction is increased by recording on a hologram recording medium the information that is to be recorded and also the information relating to an angle of incidence of the reference beam (referred to hereinbelow as "recording angle") during recording of the aforementioned information, reading the information relating to the recording angle during reproduction, and correcting the angle of incidence of the reference beam (angle of incidence with respect to the hologram recording medium during reproduction) based on this information.

Further, Japanese Patent Application Laid-open No. 2002-216359 describes a technology using the fact that the position of a reference beam projected on the pickup surface of a pickup element in which a multiplicity of light receiving elements are arranged in the form of a grid is shifted according to the shift quantity of the wavelength of the laser beam when such occurs, this technology comprising the steps of employing a wavelength-variable coherent light source as a light source, using optical received signals of the light-receiving elements in four corners of the pickup element during reproduction, detecting the shift quantity of the protection position of the reference beam on the pickup surface of the pickup element and correcting the wavelength of the laser beam outputted from the wavelength-variable coherent light source based on this shift quantity.

The aforementioned Japanese Patent Applications Laid-open Nos. H11-16374 and 2002-216359 described the realization of a portable and replaceable hologram recording medium with an optical disk configuration by using servo technology of focusing and tracking of optical disks such as CD and DVD. However, in the case of a hologram recording system, as described hereinabove, the margins for the shift of the wavelength of the light source and the shift of the angle of incidence of the reference beam are extremely narrow and cannot be considered as sufficient for the margins in the servo technology of focusing and tracking of optical disks such as CD and DVD.

For this reason, in the servo technology of focusing and tracking of optical disks such as CD and DVD, it is difficult to conduct reliably the servo control of focusing and tracking of a hologram recording medium of an optical disk type and data hardly can be reordered and reproduced with good stability.

Further, when digital data such as image data or text data are recorded on a recording medium, the recording medium is generally divided into a plurality of sectors and image data are divided and recorded in a respective plurality of sectors (unit recording areas). On the other hand, management data relating to such items as which image data has been recorded on the recording medium and which sector has been used for recording the image data are also recorded, for example, as represented by a FAT (File Allocation Table).

When the files recorded on the disk are read, first, it is necessary to read the file management information with good reliability, and unless the file management information is read with high stability and reliability, even if the disk capacity is increased, the effect attained thereby is reduced by half. Therefore, the reliability of reading and writing the management data for data being recorded is more important than that of the data being recorded. Further, even if servo control of focusing and tracking of the hologram recording medium during recording and reproduction has been realized, the device actually cannot function as a hologram recording and reproduction device unless the management data are read reliably in the subsequent recording or reproduction processing of the management data.

In the case of a hologram recording system, margins for the shift of the wavelength of the light source and the shift of the angle of incidence of the reference beam is essentially difficult to reproduce with good stability and reliability from a hologram recorded on the hologram recording medium. Therefore, it is desirable that the margins for the shift of the wavelength of the light source and the shift of the angle of incidence of the reference beam during recording and reproduction of the management information of files be relaxed with respect to the margins for the shift of the wavelength of the light source and the shift of the angle of incidence of the reference beam of the files.

The hologram recording and reproduction devices described in the aforementioned Japanese Patent Applications Laid-open Nos. H11-16374 and 2002-216359 employ servo control of focusing and tracking of the hologram recording medium of an optical disk type by using servo control technology of focusing and tracking employed in optical disks such as CD and DVD. Therefore, the stability and reliability of data recording and reproduction cab hardly be considered as sufficient.

Furthermore, the technology described in Japanese Patent Application Laid-open No. H11-16374 minimizes the angle of incidence of the reference beam by correcting the angle of incidence of the reference beam during reproduction, and the margin for the shift of the wavelength of the light source or the shift of the angle of incidence of the reference beam during recording and reproduction does not vary between files and management data for the files. Furthermore, the technology described in Japanese Patent Application Laid-open No. 2002-216359 minimizes the shift of the wavelength of the light source by changing the generation frequency of the light source during reproduction. In this case, too, the margin for the shift of the wavelength of the light source or the shift of the angle of incidence of the reference beam during recording and reproduction does not vary between files and management data for the files. Therefore, with both methods there may be cases where the files cannot be opened because file management information is not read.

In particular, if a system is used in which hologram recording is conducted by rotating a disk, the margin for the shift of the angle of incidence of the reference beam becomes even more strict because of eccentricity or in-plane wobbling caused by very small tilting of the disk, and the file management information is difficult to read. For this reason, a long time is required for reading the file management information and in some cases this information cannot be read at all. Accordingly, recording and reproduction processing is extremely difficult to conduct at a high rate and stability. Further, if the thickness of the hologram medium is increased to make a transition to ultrahigh capacity of recording by angular multiplexing, then because the margin shown in FIG. 19 is inversely proportional to the thickness of the hologram medium, this margin is further narrowed. As a result, a certain limitation is inevitably placed on the transition to ultrahigh capacity by increasing the thickness of the hologram medium.

SUMMARY OF THE INVENTION

With the foregoing in view, it is an object of the present invention to provide a hologram recording medium suitable for conducting highly accurate servo control of focusing or tracking even when it is implemented, for example, on an optical disk type and to provide a hologram recording and reproduction device capable of recording and reproducing the management information of data, which is recorded on the hologram recording medium, with stability and reliability no less than those of the data itself.

According to a first aspect of the present invention, there is provided a hologram recording medium detachably mountable on a hologram recording and reproduction device in which coherent light emitted from a light source is divided into at least a first beam and a second beam, the first beam being modulated into information light based on data to be recorded, the modulation performed by a spatial optical modulator including a plurality of optical elements arranged in a grid-like form, the second beam being made incident as reference light at a prescribed angle to the information light for recording a hologram of the information light and the reference light. The hologram recording medium of the present invention records a prescribed pattern preset to be employed for fine adjustment of servo control including tilting and focusing. The special pattern is produced by performing the light modulation in a manner such that the plurality of optical elements are divided into groups each including mutually adjacent optical elements, and that each group is associated with a bit of data to be recorded.

With the above arrangement, the recording medium stores a special pattern for performing fine adjustment of the servo control. Thus, by reading the stored special pattern during data recording or data reproduction, fine adjustment for tilting control or focusing control, for example, can be properly performed based on the special pattern.

The special prescribed pattern is formed by allocating a plurality of mutually adjacent optical elements to 1 bit. Therefore, the quantity of light per 1 bit is increased by comparison with a pattern formed by allocating one optical element to 1 bit, and the S/N margin per 1 bit during reproduction of information beam having this pattern is widened. Thus, stability of servo control is increased by conducting fine adjustment of servo control, such as tilting or focusing, by using this pattern.

According to a second aspect of the present invention, there is provided a hologram recording and reproduction device that comprises: a light source for emitting coherent light; a beam splitter for dividing the coherent light into at least a first beam and a second beam; a spatial optical modulator for modulating the first beam into information light based on data to be recorded; an optical system for making the second beam incident as reference light at a prescribed angle to the information light to record a hologram in a recording medium; and a fine adjuster for conducting, during data recording or data reproduction, fine adjustment of at least one of tilting of the recording medium, focusing of the recording medium, and a wavelength of the light source by servo control by reproducing information light including a prescribed servo control pattern from the recording medium and using a reproduction signal based on the information light.

With the above arrangement, fine adjustment of at least one of tilting of the hologram recording medium, focusing, and wavelength of the optical source controlled by servo control is conducted by reproducing information light including a prescribed servo control pattern from the hologram recording medium during data recording or reproduction and using a reproduction signal based on the information light.

Preferably, the spatial optical modulator may comprise a plurality of optical elements arranged in a grid-like form on an incidence plane of the first beam, and the information light is produced by changing the state of optical elements corresponding to each bit of the data to be recorded.

The hologram recording and reproduction device of the present invention may further comprise a pickup/reproduction unit, an optical modulation controller and a signal processing controller.

Specifically, the pickup/reproduction unit may include: a plurality of photoelectric converters arranged in a grid-like form on an incidence plane of the information light; and a signal processor for reproducing signals of bits corresponding to recorded data based on an optical signal outputted from each photoelectric converter. The optical modulation controller may be arranged to change the number of optical elements of the spatial optical modulator that correspond to 1 bit in accordance with a type of data during data recording. The signal processing controller may be arranged to conduct control so that signal processing is performed in unit of one or more photoelectric converters associated with each bit of data during data reproduction.

With the above arrangement, optical modulation of the data that are to be recorded is conducted by changing the number of optical elements of the spatial optical modulator that correspond to 1 bit according to the type of the data. Therefore, for example, if the number of optical elements of the spatial optical modulator corresponding to 1 bit is increased with respect to the management data for managing the data, then the margin of S/N per 1 bit is widened with respect to the case where one optical element is associated with 1 bit, and the reliability of management data recording and reproduction is increased.

Preferably, the optical modulation controller may increase the number of optical elements of the spatial optical modulator that correspond to 1 bit when management data for controlling data recording and data reproduction is recorded in the recording medium.

With the above arrangement, the optical element of the spatial modulator corresponding to 1 bit is increased to a plurality of mutually adjacent optical elements with respect to the management data. Therefore, the margin of S/N per 1 bit is widened with respect to the case where one optical element is associated with 1 bit, the reliability of management data recording and reproduction is increased, and therefore the reliability of recording and reproduction of usual data can be increased.

Preferably, the recording medium may comprise a first recording area having a relatively thin hologram recording layer and a second recording area having a relatively thick hologram recording layer, and the management data is recorded in the first recording area.

With the above arrangement, the management data is recorded in the recording area with a small thickness of the hologram recording layer. Thus, the margin of S/N per 1 bit is further widened, and the reliability of recording and reproduction of the management data is further increased.

DETAILED DESCRIPTION OF THE PREFERRED EMBODIMENTS

The first embodiment of the hologram recording and reproduction device in accordance with the present invention will be explained by using the drawings.

The hologram recording and reproduction device of the first embodiment uses a replaceable hologram recording medium of an optical disk type. In this device, data having a prescribed special pattern different from the light image (referred to hereinbelow as a recording pattern) generated by spatial light modulator based on the recording data during recording are recorded in the prescribed address position of the hologram recording medium. During recording or during reproduction, fine adjustment of servo control of focusing or tilting of the hologram recording medium is conducted by using the pattern of those data (this pattern will be referred to as "special pattern" in order to distinguish it from the usual recording pattern of the recording data).

In the present embodiment, data having the special pattern are recorded in the address position different from that of the usual recording data. However, it is also possible to weave part of the special pattern into the pattern of usual recording data, thereby conducting servo control of focusing or tilting in a real time mode during recording and reproduction of the recording data.

Figure 1:
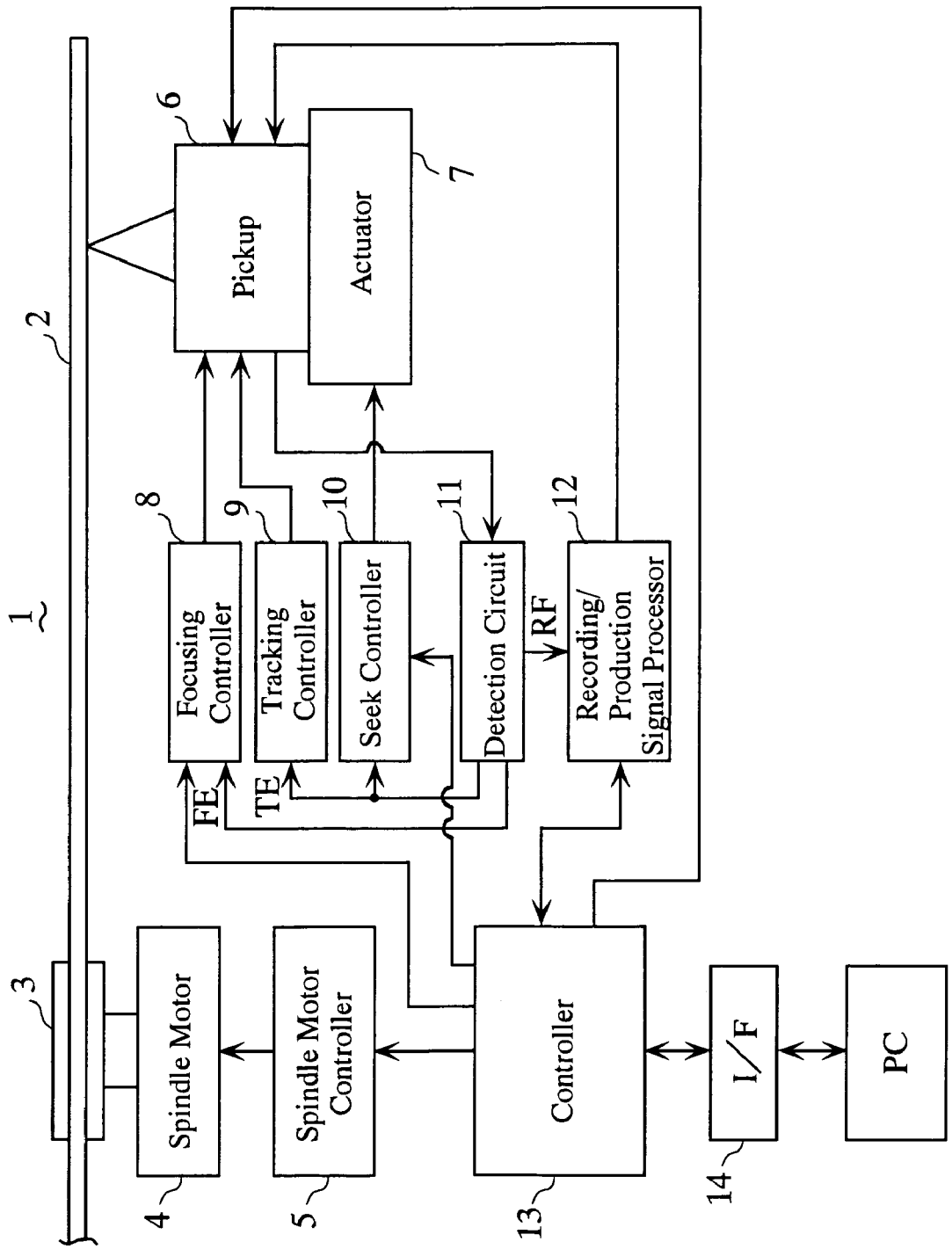
FIG. 1 illustrates the entire configuration of the hologram recording and reproduction device in accordance with the present invention.
Figure 2:
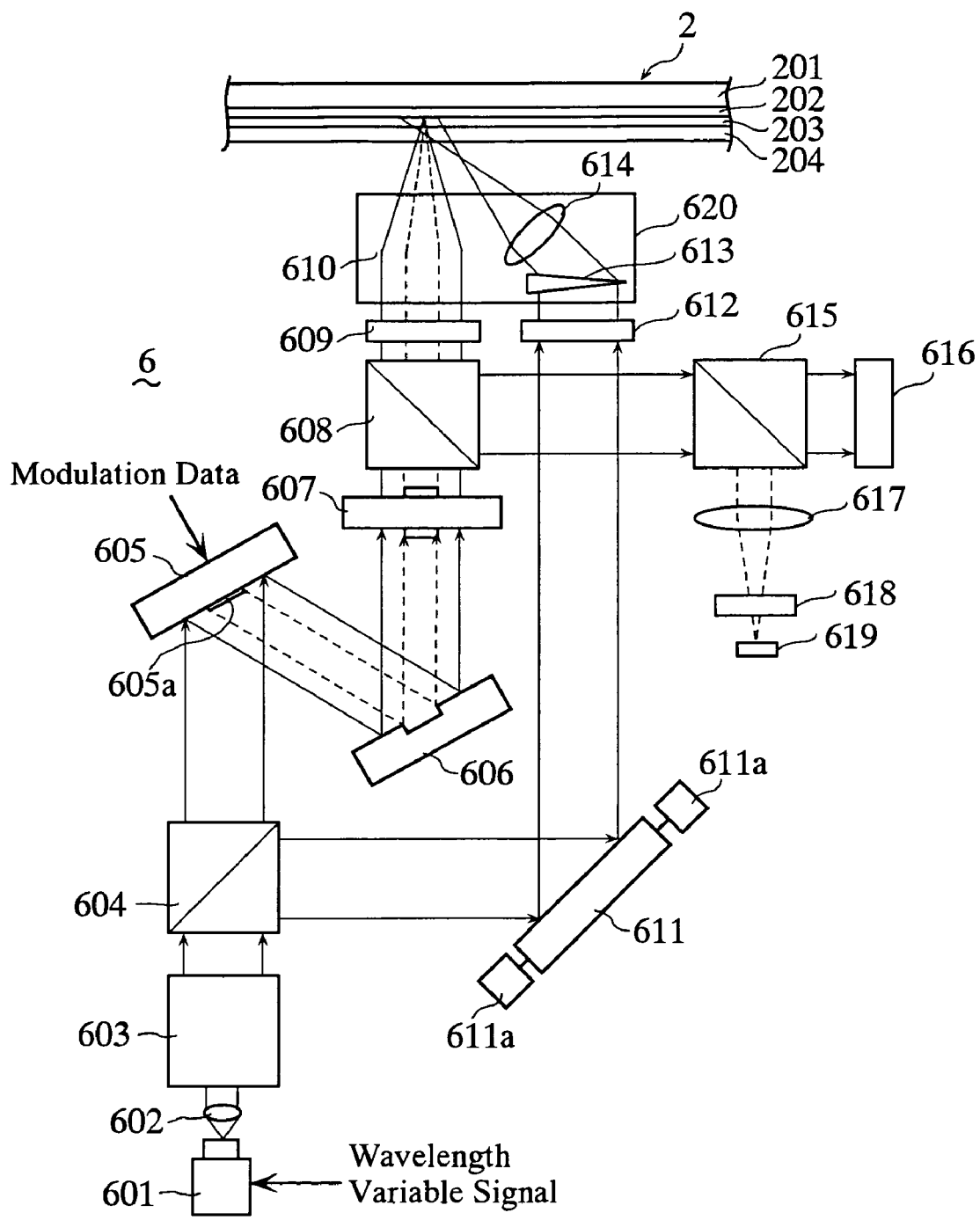
FIG. 2 shows the optical system of the pickup.
Figure 3:
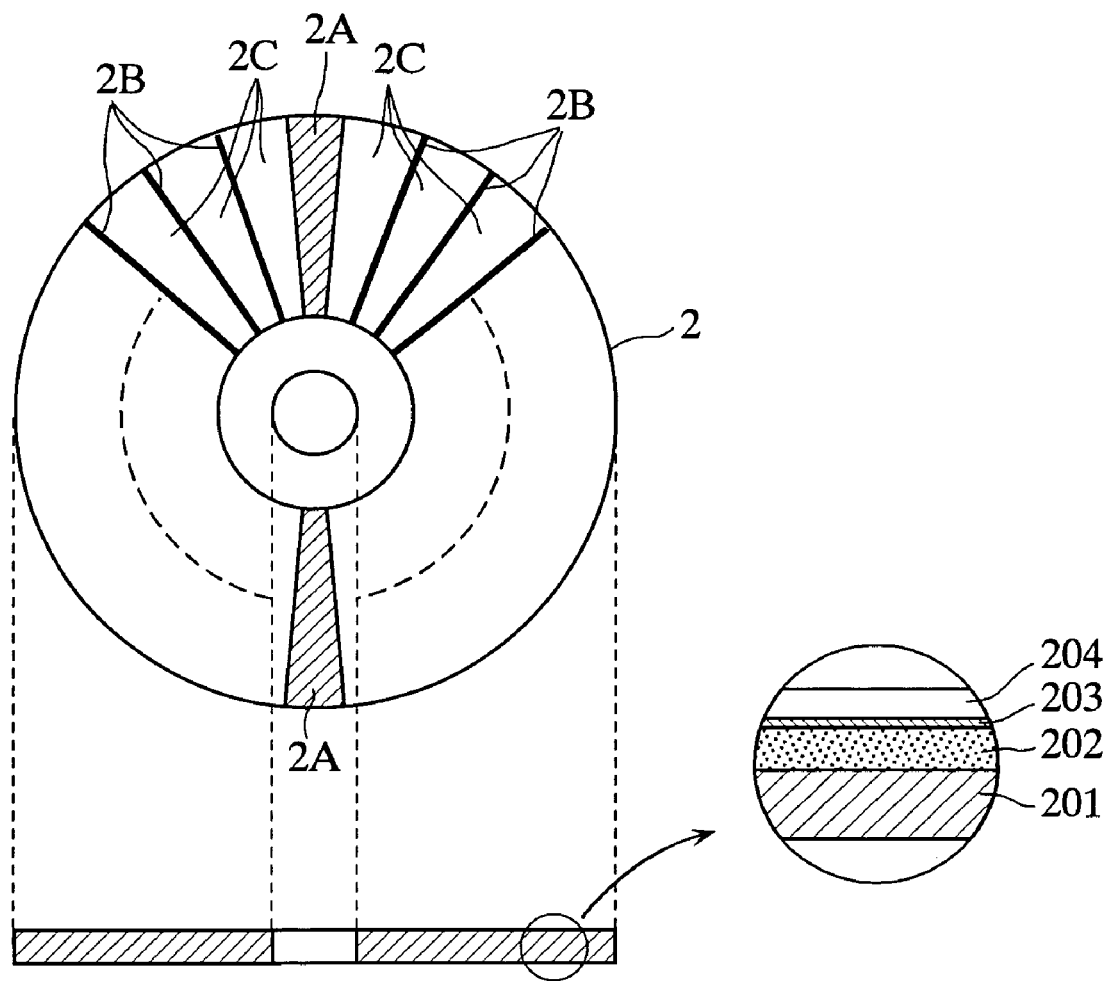
FIG. 3 shows the configuration of the hologram recording medium employed in the hologram recording and reproduction device of the present embodiment.

FIG. 1 shows the entire configuration of the hologram recording and reproduction device of the present embodiment. FIG. 2 shows the optical system of a pickup of the hologram recording and reproduction device of the present embodiment. FIG. 3 shows the configuration of the hologram recording medium employed in the hologram recording and reproduction device of the present embodiment.

A hologram recording and reproduction device 1 comprises a spindle 3 for detachable mounting of a hologram recording medium 2 of a disk type, a spindle motor 4 composed, for example, of a brushless DC motor, for rotating the spindle 3, and a spindle motor control circuit 5 for controlling the rotation of the spindle motor 3.

Further, there are also provided a pickup 6 for illuminating the hologram recording medium 2 with a recording beam (a beam obtained by dividing a laser beam and spatially light modulating by the data that have to be recorded) and a reference beam (another divided beam obtained by dividing the laser beam), recording the hologram (interference pattern) of the recording beam and reference beam, generating a diffraction beam (reproduction beam) with the hologram by illuminating the hologram recording medium 2 with the reference beam, receiving this reproduced beam with the pickup element, and reproducing the recorded data, an actuator for moving the pickup 6 in the radial direction of the hologram recording medium 2, a focusing control circuit 8 for controlling the focus of the light spot illuminating the hologram recording medium 2 from the pickup 6, a tracking control circuit 9 for controlling this illumination position so that the light spot illuminated from the pickup 6 on the hologram recording medium 2 moves along the track of the hologram recording medium 2 when the hologram recording medium 2 rotates, and a seek control circuit 10 for moving the light spot to the designated track position of the hologram recording medium 2 and controlling the movement of the light spot in the radial direction of the hologram recording medium 2 for recording or reproducing the data.

Further, the hologram recording and reproduction device 1 also comprises a detection circuit 11 for generating a focus error signal (FE) and tracking error signal (TE) based on the received optical signal obtained by receiving light for servo control that is reproduced from a light receiving element (described hereinbelow) located inside the pickup 6 and for generating a reproduction signal (RF) based on the received optical signal that was obtained by receiving the reproduction beam outputted from the pickup element (described hereinbelow), a recording and reproduction signal processing circuit 12 for conducting the reproduction of the recording data by conducting the prescribed signal processing of the reproduction signal (RF) outputted form the detection circuit or generating the modulation data with the spatial light modulator located inside the pickup by conducting the prescribed signal processing of the data for recording that are inputted from a controller 13, the system controller 13 for controlling the operation of circuits from the spindle motor control circuit 5 to recording and reproduction signal processing circuit 12, and an I/F 14 for connecting the host computer PC to the hologram recording and reproduction device 1.

The hologram recording medium 2, as shown in FIG. 3, is a recording medium of a disk type similar to an optical disk memory such as CD or DVD. The hologram recording medium 2 is obtained by stacking a reflective film 202, a hologram recording layer 203 for recording information by using holography, and a protective layer 204 in the order of description on one surface of a disk-like substrate 201 from a polycarbonate or the like. The refractive index of the protective layer 204 has a value close to that of the hologram recording layer. The hologram recording medium 2 is provided with two address information recording portions 2A (in FIG. 3 they are disposed on a radius) extending in the radial direction and a plurality of servo information recording portions 2B extending linearly in the radial direction with the prescribed angular spacing in the circumferential direction in the area sandwiched between the address information recording portions. Further, areas 2C between the adjacent servo information recording portions 2B serve as information recording portions for recording information by holography.

In the address information recording portions 2A, the address information of each track (track number) is recorded by emboss pits. Furthermore, in the servo information recording portions 2B, the prescribed information for tracking servo control is recorded by emboss pits.

Returning to FIG. 1, the spindle motor 4 rotates the hologram recording medium 2 in the prescribed direction at a prescribed speed. The drive of the spindle motor 4 is controlled based on the control signal from the spindle motor control circuit 5. Furthermore, the control of the drive of the spindle motor is conducted by the system controller 13. The system controller 13 outputs the timing signals of the rotation start and rotation stop of the spindle motor 4 to the spindle motor control circuit 5, and the spindle motor control circuit 5 controls the drive/stop of the spindle motor 4 based on those timing signals.

The pickup 6 comprises an optical system shown in FIG. 2. As shown in the figure, the optical system comprises a laser beam source 601 capable of varying the wavelength, a collimator lens 602, a beam expander 603, a first beam splitter 604, a spatial light modulator 605, a first dividing prism 606, a second dividing prism 607, a second beam splitter 608, a first λ/4 plate 609, a first objective lens 610, a reflecting mirror 611, a second λ/4 plate 612, a prism 613, a second objective lens 614, a third beam splitter 615, a pickup element 616, a convex lens 617, a cylindrical lens 618, and a light receiving element 619.

The collimator lens 602, beam expander 603, first beam splitter 604, and spatial light modulator 605 are disposed in the order of description on the optical axis of the laser beam source 601, and the reflecting mirror 611 is disposed in the prescribed position in the direction perpendicular to the optical axis of the laser beam source 601 opposite the first beam splitter 604. The reflecting mirror 611 is so disposed that the optical axis of the reflected light thereof becomes parallel to the optical axis of the laser beam source 601.

The collimator lens 602 converts the laser beam outputted from the laser beam source 601 into a parallel beam. The beam expander 603 expands the parallel light outgoing from the collimator lens 602. The first beam splitter 604 divides the parallel light outgoing from the beam expander 603 into two beams. One of them is caused to propagate forward and guided to the spatial light modulator 605, and the other one is reflected at a right angle and guided to the reflecting mirror 611.

The light receiving surface of the spatial light modulator 605 that receives the laser beam from the laser beam source 601 is tilted at the prescribed angle to the optical axis. The first dividing prism 606 is disposed in the prescribed position on the optical axis of the reflecting light in the spatial light modulator 605. The first dividing prism 606 is so disposed that the optical axis of the reflected light thereof becomes parallel to the optical axis of the laser beam source 601. The second dividing prism 607, second beam splitter 608, first λ/4 plate 609, and first objective lens 610 are disposed in the order of description on the optical axis of the reflected light of the first dividing prism 606.

Components from the laser beam source 601 to the first prism splitter 604 and to the first objective lens 610 constitute an optical system for generating a recording beam and a beam for servo control such as tracking (referred to hereinbelow as a servo control beam) and for illuminating the hologram recording medium 2 with the recording beam and servo control beam. The focal point of the recording beam falling on the first objective lens 610 is adjusted so as to form the image on the hologram recording layer 203 by the objective lens 610.

The spatial light modulator 605 is composed of a DMD (Digital Mirror Device) in which a multiplicity of micromirrors (optical elements in accordance with the present invention) are disposed in the form of a grid so that the reflective surface thereof can be varied. A micromirror is associated with each bit constituting the digital data and the optical image corresponding to digital data that has to be illuminated on the hologram recording medium 2 and recorded therein is generated by changing the reflecting mirror according to the contents ("0" or "1") of the bit.

Figure 4:
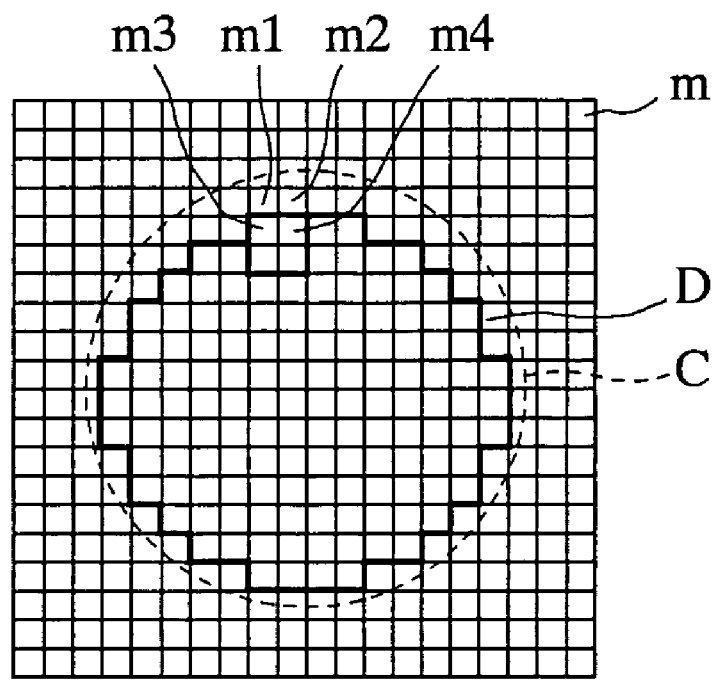
FIG. 4 shows the relationship between the configuration of the reflecting surface of the spatial optical modulator and the optical image of the laser beam used for illumination.

Thus, in the spatial light modulator 605, as shown in FIG. 4, a multiplicity of micromirrors m are disposed as an N×M grid (in FIG. 4, in the form of a square) on the surface facing the first beam splitter 604, and this surface is so disposed that the light beams falling on the first beam splitter 604 of each mirror m in the case without modulation are reflected toward the first dividing prism 606. More specifically, a laser beam of a circular shape C shown by dot line in FIG. 4 falls on the reflecting surface from the first beam splitter 604 and in a state without modulation, the round optical image is reflected toward the first dividing prism 606.

Micromirrors m (micromirrors within the area surrounded by a solid line D) within a range of the circle C illuminated by the laser beam of the spatial light modulator 605 serve as micromirrors for spatial light modulation by the digital data that are to be recorded, and each micromirror m is associated with each bit constituting the digital data.

Figures 5A, 5B:
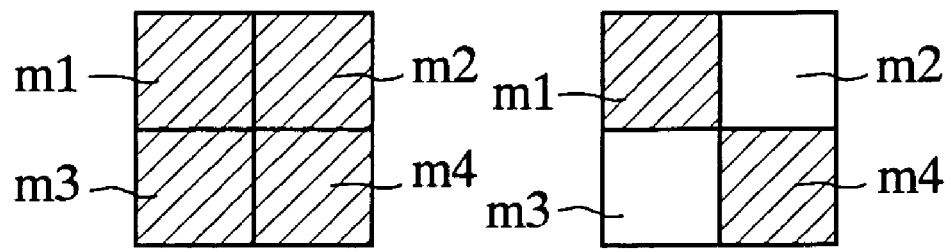
FIGS. 5A and 5B explain optical modulation with the spatial optical modulator.

For example, if we assume that each bit of digital data composed of certain four bits (a1, a2, a3, a4) is allocated to four adjacent micromirrors m1 to m4 in the uppermost portion in the area, then when the digital data is (0, 0, 0, 0), the reflecting surfaces of the four micromirrors m1 to m4 change and, as shown in FIG. 5A, the area corresponding to the micromirrors m1 to m4 from which the light is to be guided to the first dividing prism 606 does not emit light at all (the non-emitting state is represented by hatching in FIG. 5A). On the other hand, when the digital data is (0, 1, 0, 1), only the reflecting surfaces of micromirrors m2, m4 change and, as shown in FIG. 5B, the light is emitted only from the portions corresponding to micromirrors m2, m3 in the area corresponding to the micromirrors m1 to m4 from which the light is to be guided to the first dividing prism 606. In contrast to the above-described example, the light may be also emitted when the bit is "0" and not emitted when the bit is "1".

Thus, each bit of digital data which are to be recorded based on the prescribed form a is allocated to micromirrors m in the recording area D, and digital data which are to be recorded and are inputted from the recording and reproduction signal processing circuit 12 are modulated into a two-dimensional optical image (binary optical image) within the recording area D by changing the reflection angle of each micromirror according to the bit structure of digital data. Further, this optical image as a recording beam illuminates the hologram recording medium 2 via the components from the first dividing prism 606 to the first objective lens 610.

With the hologram recording method, a plurality of digital data are converted into two-dimensional optical image based on the bit configuration of the data, and this two-dimensional optical image is recorded with angular multiplexing in the same position of the hologram recording medium 2. Therefore, the capacity can be increased.

The first dividing prism 606 and second dividing prism 607 separate the reflected beam from the spatial light modulator 605 into a recording beam and a servo control beam and guide the two beams to the components from the second beam splitter 608 to the first objective lens 610. Because a reflecting mirror 605a is provided in the central portion of the spatial light modulator 605, the light beam of the central portion, of the light beam reflected from spatial light modulator 605, is separated as the servo control beam by the first dividing prism 606 and second dividing prism 607. Therefore, because the reflecting mirror 605a for separating the servo control beam is provided in the central portion in the recording area in the spatial light modulator 605, the reflecting beam of this portion is not used for light modulation of digital data.

The second beam splitter 608 guides to the third beam splitter 615 of the detection system the diffraction beam (the beam obtained by reproducing the recording beam. It is called hereinbelow the reproduction beam) that is coming in from the hologram recording medium 2 via the first objective lens 610 and first λ/4 plate 609 during reproduction. In the second beam splitter 608, the recording beam and servo control beam from the first dividing prism 606 and second dividing prism 607 propagate forward and are guided to the hologram recording medium 2 via the first λ/4 plate 609 and first objective lens 610.

The first λ/4 plate 609 converts the recording beam and servo control beam outgoing from the second beam splitter 608 from a linearly polarized light into a circularly polarized light. The recording beam and servo control beam of a circularly polarized light outgoing from the first λ/4 plate 609 is so illuminated as to be converged on the hologram recording layer 203 of the hologram recording medium 2. The first objective lens 610, prism 613, and second objective lens 614 are integrated into a unit, and this unit 620 can be finely shifted forward, backward, to the left, and to the right with respect to the hologram recording medium 2. The focusing position or tracking of the recording beam and servo control beam on the hologram recording medium 2 is adjusted by finely shifting the unit 620 with an actuator (not shown in the figure). The adjustment of the focusing position is conducted by servo control of the focusing control circuit 8, and the adjustment of tracking is conducted by servo control of the tracking control circuit 9.

The servo control beam falling on the hologram recording medium 2 is used to read the address information of information for servo control that was recorded by emboss pits on the address recording information portion 2A and servo information recording portion 2B. The reflected light of the servo control beam from the hologram recording medium 2 falls an the second beam splitter 608 via the first objective lens 610 and first λ/4 plate 609. The reflected light of the servo control beam is converted with the first λ/4 plate 609 from the circularly polarized light into a linearly polarized light, but because the polarization direction is different form that of the servo control beam incoming from the second dividing prism 607, it is guided by the second beam splitter 608 to the third beam splitter 615.

The second λ/4 plate 612, prism 613, and second objective lens 614 are disposed in the order of description on the optical axis of the reflected beam of the reflecting mirror 611. Components from the laser beam source 601 to the first beam splitter 604 and from the reflecting mirror 611 to the second objective lens 614 constitute an optically system for generating a reference beam and illuminating the hologram recording medium 2 with the reference beam at the prescribed angle of incidence with respect to the optical axis of the recording beam.

Further, the reflected beam (reference beam) from the reflecting mirror 611 is converted from linearly polarized light to circularly polarized light with the second λ/4 plate 612, and the optical axis thereof is changed by the prism 613 toward the optical axis of the recording beam. As a result, the reference beam falls on the hologram recording medium 2 at the prescribed angle of incidence with respect to the optical axis of the recording beam. The focal point of the recording beam incoming from the second objective lens 614 is so adjusted that the image is formed on the hologram recording layer 203 by the objective prism 610. The reference beam and recording beam falling on the hologram recording medium 2 mutually interfere, producing a hologram, and this hologram is recorded on the hologram recording medium 2.

Further, the reflecting mirror 611 is held by the actuator 611a so that the angle of reflection can be finely changed. Finely changing the angle of reflection of the reflecting mirror 611 with the actuator 611a makes it possible to adjust (fine adjustment of tilting) the fine changing of the angle of incidence of the reference beam with respect to the hologram recording medium 2 caused by in-plane wobbling (wobbling in the circumferential direction (scanning direction of the illumination beam of the pickup 6) or radial direction of the disk) during rotation of the hologram recording medium 2.

During reproduction, the laser beam outputted from the laser light source 601 illuminates the hologram recording medium 2 via the optical system of the reference beam, but because the adjustment is so conducted that the recording beam is not generated by the spatial light modulator 605 at this time, the hologram recording medium 2 is illuminated only with the servo control beam and reference beam. The reproduction beam is generated by the reference beam and the hologram recorded on the hologram recording layer 203 of the hologram recording medium 2, and this reproduction beam is guided, as described above, to the second beam splitter 608 via the first objective lens 610 and first λ/4 plate 609. This reproduction beam is also converted with the first λ/4 plate 609 from the circularly polarized light into a linearly polarized light, but because the polarization direction is different form that of the servo control beam incoming from the second dividing prism 607, it is guided by the second beam splitter 608 to the third beam splitter 615.

The third beam splitter 615 is disposed in the prescribed position in the direction perpendicular to the optical axis of the laser beam source 601 opposite the second beam splitter 608, and a pickup element 616 id disposed behind the third beam splitter. Furthermore, the convex lens 617, cylindrical lens 618, and light emitting element 619 are disposed in the order of description on the optical axis of the reflected light of the third beam splitter 615 which is parallel to the optical axis of the laser beam source 601.

During reproduction, the third beam splitter 615 guides the reproduction beam outgoing from the second beam splitter 608 into the pickup element 616 located behind it, whereas during recording-reproduction, the third beam splitter separates the servo control beam outputted from the second beam splitter 608 and guides it into the light receiving element 619 via the convex lens 617 and cylindrical lens 618.

The pickup element 616 is composed of an area sensor in which a plurality of photoelectric elements are arranged in the form of a grid at a resolution equal to or higher than that of the spatial light modulator 605, for example, of a CCD (Charge-Coupled Device) sensor. The pickup element 616 is not limited to CCD and may be a MOS (Metal Oxide Semiconductor) solid pickup element. The center of the pickup surface of the pickup element 616 is disposed so as to match the center of the optically modulated optical image generated by the spatial light modulator 605. For example, when an optical image from one micromirror m of the spatial light modulator 605 is received by four photoelectric elements, the optical image created by the micromirror, for example, of the n-th row and m-th column of the spatial light modulator 605 will be received by four photoelectric elements located in the (2n−1)-th row and (2m−1)-th column, 2n-th row and (2m−1)-th column, 2n-th row and (2m+1)-th column, and 2n-th row and 2m-th column on the photoelectric element. Therefore, if the optical conditions during reproduction are identical to optical conditions during recording, then the reproduction beam guided by the third beam splitter 615 will be projected in a state identical to that shown in FIG. 4 on the pickup surface of the pickup element 616, and the light beam of the pixel position of the n-th row and m-th column of the optical image will fall on four pixels in the (2n−1)-th row and (2m−1)-th column, 2n-th row and (2m−1)-th column, 2n-th row and (2m+1)-th column, and 2n-th row and 2m-th column of the pick-up element 616.

Therefore, the reproduction (reproduction of reproduction signal (RF)) of digital data recorded on the hologram recording medium 2 is conducted by detecting the received optical signals of the pixels in the area of the pickup element 616 corresponding to the area D of the spatial light modulator 605. The received optical signal that was received by the pixels of the pickup element 616 is inputted into the detection circuit 11, and a reproduction signal (RF) is generated in the detection circuit 11 based on the received optical signal thereof. For example, in the example shown in FIG. 5B, if the pixel group (for example, four pixels corresponding to micromirrors m) of the pickup element 616 corresponding to the micromirrors m1 to m4 is denoted by g1 to g4, then the reproduction beam will fall on the pixel group g1, g3, but no reproduction beam will fall on the pixel group g2, g4. Therefore, the digital data (1, 0, 1, 0), that is, the recorded digital data is reproduced by the received optical signals of the pixel group g1 to g4 by conducting signal processing so that the pixels that have received the light in the detection circuit 11 are "1" and the pixel group that has not received the light is "0". The reproduction signal (RF) is inputted into the recording and reproduction signal processing circuit 12.

The light receiving element 619 is composed of a photodiode with a light receiving surface divided into four sections. The servo control beam separated by the third beam splitter 615 is converged on the light receiving element 619 by the convex lens 61 and cylindrical lens 618. The received optical signal obtained by receiving the servo control beam outputted from the light receiving element 619 is inputted into the detection circuit 11, and a focus error signal (FE) and a tracking error signal (TE) are generated by the detection circuit 11 by using the received optical signals of each area of the four divided sections. The focus error signal (FE) is inputted into the focusing control circuit 8 and the tracking error signal (TE) is inputted into the tracking control circuit 9.

Returning to FIG. 1, the actuator 7 moves a carriage holding the pickup 6 in the radial direction of the hologram recording medium 2. The actuator 7 is driven by a stepping motor (not shown in the figure). A seek operation is conducted by moving the carriage in the radial direction. The control of this seek operation is conducted by the seek control circuit 10. The seek control circuit 10 generates a seek control signal based on the information on the present track position of the pickup 6 inputted from the detection circuit 11 and the information on the track position into which the carriage should be moved, this information being inputted from the system controller 13. The generated seek control signal is outputted into the actuator 7. The actuator 7 drives the stepping motor based on this seek control signal, thereby moving the pickup 6 to the target track position.

During recording, the recording and reproduction signal processing circuit 12 generates modulation data with the spatial light modulator 605 from the digital data (comprise not only the data that have to be recorded (referred to hereinbelow as "recording data"), such as image data or test data, but also data (referred to hereinbelow as "management data"), for example FAT (File Allocation Table) for managing the aforementioned data) inputted from the system controller 13 and inputs the modulated data into the pickup 6. Furthermore, during reproduction, the recording data or management data are generated from the reproduction signal (RF) inputted from the detection circuit and the generated data are inputted into the system controller 13.

The system controller 13 conducts general control of the operation of the hologram recording and reproduction device 1 and is composed of a microcomputer. The system controller 13 controls the operation of various circuits such as the spindle motor control circuit 5, seek control circuit 10, and recording and reproduction signal processing circuit 12, and conducts recording or reproduction of data according to a command inputted from the host computer PC via the I/F 14. In the present embodiment, the configuration is employed in which a recording or reproduction command is inputted from the host computer PC, but a control unit by which a user inputs various instructions may be provided instead of the I/F 14 and data recording or reproduction instructions may be inputted into the system controller 13 from this control unit.

Further, the system controller 13, as described hereinbelow, reads data having a special pattern that was recorded in advance in the prescribed address position of the hologram recording medium 2 during recording or reproduction, conducts fine adjustment of tilting, focusing, and wavelength of the laser beam outputted from the laser beam source 601, and conducts stabilization of servo control originating from the displacement of the hologram recording medium 2 with respect to the pickup 6 or in-plane wobbling caused by rotation. The configuration relating to the stabilization of this servo control is a specific configuration of the hologram recording and reproduction device 1 of the first embodiment.

The specific configuration of the hologram recording and reproduction device of the first embodiment will be explained below.

The hologram recording and reproduction device of the first embodiment features a configuration which conducts recording of data having a special pattern in the prescribed address position separately from the recording data, or management data of this recording data, or directory data, reads the data of this special pattern (referred to hereinbelow as "special data") during recording on the hologram recording medium 2 or reproduction therefrom, and conducts fine adjustment of servo control of focusing and tilting or fine adjustment of the wavelength of the laser beam source by using the signal that was read out.

Thus, as described hereinabove, in the usual recording data, each 1 bit constituting the recording data is allocated to respective micromirror m of the spatial light modulator 605 and an optical image (recording pattern) of the recording light is generated. However, the special data are divided into units of a plurality of micromirrors m (for example, a set of four micromirrors m or nine micromirrors) with adjacent reflecting surfaces of the spatial light modulator 605, each 1 bit constituting the special data is allocated to a plurality of micromirrors m of divided units and an optical image of recording light is generated.

Figure 6:
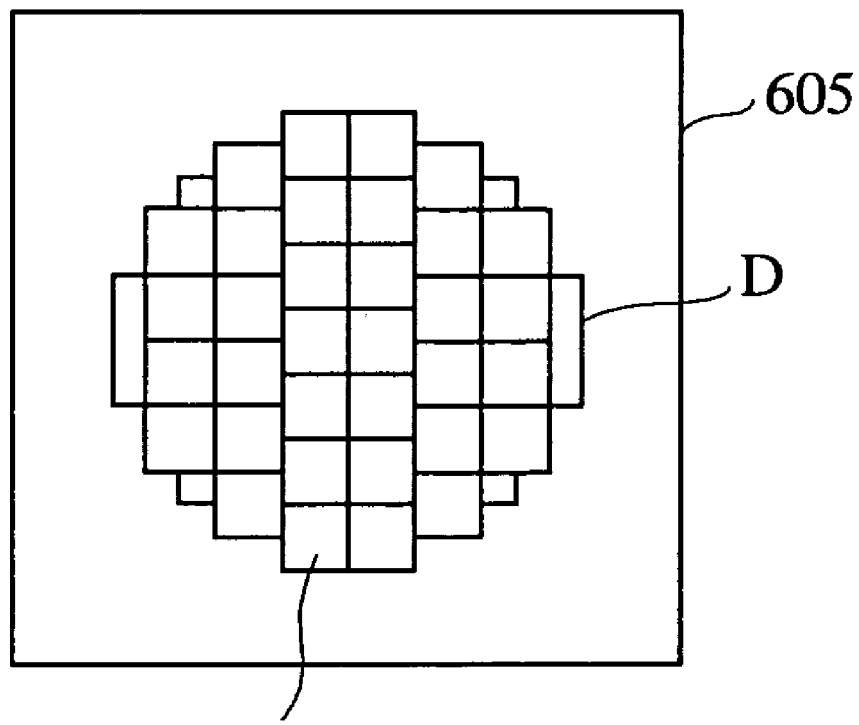
FIG. 6 shows an example of the method for increasing the number of pixels per 1 bit of the optical image generated by the spatial optical modulator.

For example, in the examples shown in FIG. 4, the recording area D comprises 128 micromirrors m and in the recording data a total of 128-bit data are recorded as 1-page data, whereas in the special data, four micromirrors m are allocated to 1 bit and, as shown in FIG. 6, 34 bits are recorded as 1-page data. Therefore, comparing by the resolution of the optical image of the recording light of one page, the special data have smaller resolution than the recording data. On the other hand, if the quantity of light per 1 bit during data reproduction from the reproduction beam is compared, the special data have higher quantity of light than the recording data.

Thus, the resolution of the special pattern of the special data is decreased for the reason as follows. Because the allowed range (margin) of S/N per 1 bit is increased, as explained hereinbelow, stabilization of servo control is conducted by using the special pattern of the special data and recording and reproduction can be conducted reliably.

Figure 19:
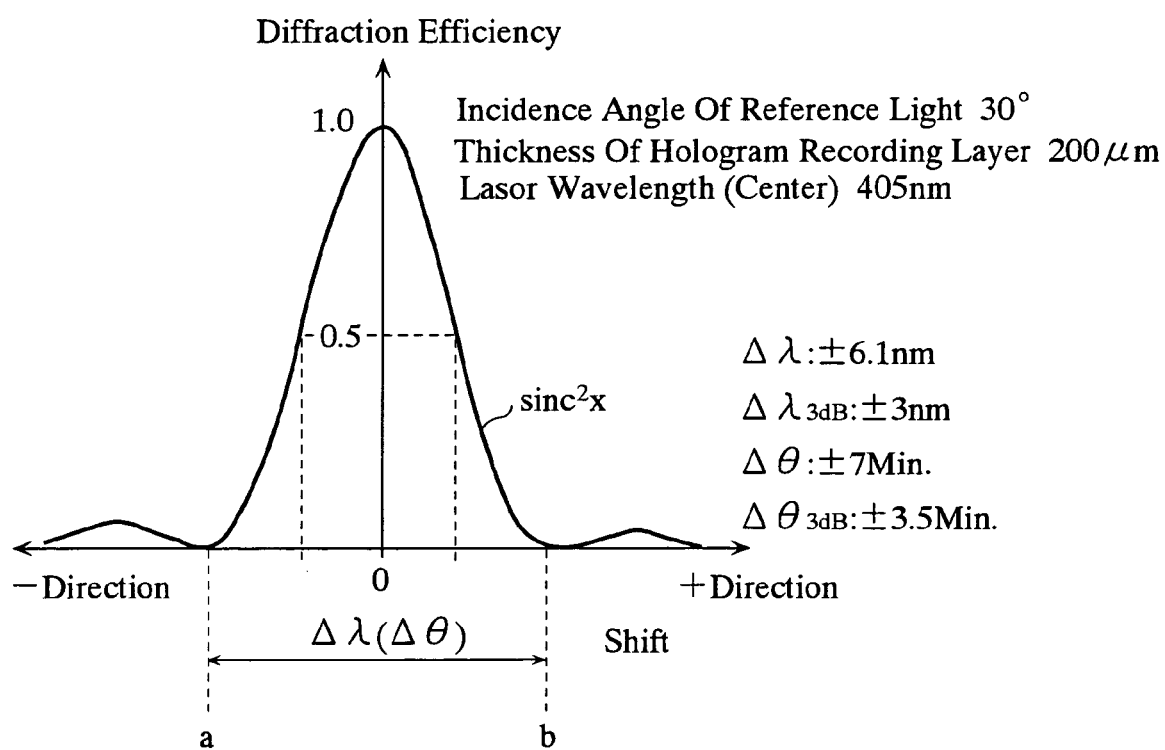
FIG. 19 shows the characteristic of diffraction efficiency in the hologram recording and reproduction system.

The hologram recording system, as was explained by using FIG. 19, has the following specific features: the allowed range $\Delta\theta_{3dB}$ of the shift of the angle of incidence of the reference light is about ±3.5 min, the margin $\Delta_{3dB}$ of the shift of the wavelength of the light source is about ±3.5 nm, angle selectivity and wavelength selectivity are very high, and the diffraction efficiency drops significantly due to even very small shift of the angle of incidence of the reference light of the wavelength of the light source.

Speaking about the optical image of the reproduction beam, the above-mentioned margins $\Delta\lambda_{3dB}$ and $\Delta\theta_{3dB}$ are applied to the received optical signal of each pixel g of the pickup element 619, and from the standpoint of the S/N ratio of the received optical signal of each pixel in the signal processing circuits of the last stage from the pickup element 619, the level of the received optical signal is greatly reduced by the shift of the angle $\theta$ of incidence of the reference light and shift of the wavelength $\lambda$ of the light source. It means that the margin of S/N per one 1 bit relating to those shifts is extremely narrow.

FIG. 19 shows a characteristic obtained by normalizing the peak value of the diffraction efficiency to "1". Therefore, the maximum value of S/N in the case without the shift of the angle $\theta$ of incidence of the reference light and shift of the wavelength $\lambda$ of the light source apparently does not vary between the pixels of the pickup element 619 and the margin of S/N is also almost the same for all the pixels. However, when the recording of the second page is conducted at an output of the laser beam source 601 increased with respect to that of the first page, the absolute quantity of light of the reproduction beam also becomes higher for the second page than for the first page. Therefore, if we assume that the N (noise) level in the pickup element 619 and circuits of the stages thereafter does not change, then the S/N ratio increases according to the increase in the S (signal) level, and the margin of S/N per 1 bit with respect to the shift of the angle $\theta$ of incidence of the reference light and shift of the wavelength $\lambda$ of the light source expands accordingly.

With the method by which the division number of the spatial light modulator 605 of the present embodiment is apparently decreased and the recording pattern with reduced resolution is generated (a method for generating a recording pattern by allocating a plurality of adjacent micromirrors m to 1 bit) the quantity of light per 1 bit is increased and the S/N ratio per 1 bit is increased by fixing the output of the laser beam source 601 and integrating the quantity of light received by a plurality of adjacent pixels, and the margin of S/N per 1 bit relating to the shift of the angle $\theta$ of incidence of the reference light and shift of the wavelength $\lambda$ of the light source is expanded.

Thus, if the signal level (component of reproduction beam) relating to one pixel imputed into the signal processing circuits of stages after the pickup element in the case where one pixel is allocated to 1 bit is denoted by Cin, the noise level (the unnecessary light component which is different form the reproduction beam) is denoted by Nin, and the noise level of the pickup element and the signal processing circuits of stages after the pickup element is denoted by Nk, then the (S/N)a per 1 bit will be $(S/N)a = Cin/\sqrt{(Nin^2+Nk^2)}$.

On the other hand, if the signal level for one pixel inputted into the signal processing circuit of the last stage from the pickup element 619 in the case where, for example, four pixels are allocated to 1 bit is denoted by Cin', the noise level is denoted by Nin', and the noise level of the signal processing circuit is denoted by Nk', then the following equations can be considered: $Cin' \approx 4Cin$, $Nin' \approx 4Nin$, $Nk' \approx Nk$. Therefore, the (S/N)b per 1 bit becomes $(S/N)b = 4Cin/\sqrt{(16Nin^2+Nk^2)}$.

Therefore, the ratio of (S/N)b and (S/N)a will be $(S/N)b/(S/N)a = 4\sqrt{(Nin^2+Nk^2)}/\sqrt{(16Nin^2+Nk^2)}$, and under the assumption that Nin=Nk, this ratio will be $(S/N)b/(S/N)a = 4\sqrt{(2)}/\sqrt{(17)} \cong 1.37$.

Therefore, if $Nin \leq Nk$, then S/N per 1 bit is always larger when the number of pixels per 1 bit is increased and the margin of S/N relating to the shift of the angle theta of incidence of the reference beam or the shift of the wavelength lambda of the light source is advantageously increased. The signal processing circuit employed in the hologram recording and reproduction devices has a last-stage noise higher than that of the circuits using, for example, a PIN photodiode that are used in 640 mega MO (Magnet Optical disk) or DVD and it can be assumed that $Nin \leq Nk$. Therefore, a recording system in which the number of pixels per 1 bit is apparently increased can be said to be preferred for usage in the hologram recording and reproduction devices.

The above discussion relates to the case of reproduction, but the recording system in which the number of pixels per 1 bit is increased is also effective in the case of recording. Thus, in servo control of focusing or tracking of optical disks, generally there are residuals, and if the S/N ratio per 1 bit is increased as much as possible by increasing the number of pixels per 1 bit to eliminate the residuals originating during recording, then the relative level of jittering of the recording pattern occurring due to the shift of focusing or shift of tracking can be reduced and reliability of servo control of focusing or tracking during recording can be increased.

Apparent increase in the number of pixels per 1 bit and apparent decrease in the resolution of the recording pattern can widen the margin of the shift of the angle $\theta$ of incidence of the reference beam or the shift of the wavelength $\lambda$ of the light source and increase the stability of data recording and reproduction to the degree to which the margin of S/N per 1 bit is widened, but increasing the number of pixels per 1 bit results in decreased capacity of recorded data per one page. Therefore, when the recorded data are spread over multiple pages, the number of pages increases which is disadvantageous for increasing the capacity by angular multiplexing.

Therefore, in the present embodiment, the method of increasing the number of pixels per 1 bit is not employed for recording data, special data having a special pattern are separately recorded, fine adjustment of tilting or focusing or fine adjustment of the wavelength of the laser light source is conducted by using this special pattern of the special data, and the pull-back of the servo control can be conducted with better stability and reliability. Further, the method of increasing the number of pixels per 1 bit may be also employed for management data and the reliability of management data reproduction may be increased.

In addition to allocating a plurality of adjacent pixels to 1 bit, a method of allocating a plurality of discrete pixels to 1 bit can be also considered as a method for increasing the number of pixels per 1 bit in the recording pattern. However, as explained hereinbelow, in terms of the margin of S/N per 1 bit, the former method is superior to the latter one. Therefore, it is preferred that the former method be used.

The margin of S/N per 1 bit in the case where the hologram recording medium was tilted in the arrangement direction of pixels thereof can be studied in regard to an example of allocating two adjacent pixels per 1 bit and allocating two pixels separated by one pixel per 1 bit, with respect to the case where servo control of tilting is conducted, for example, in the rotation direction to the hologram recording medium of an optical disk type. The following results are obtained.

Figure 7A:
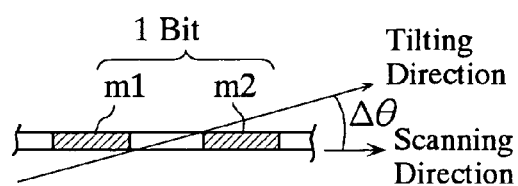
FIGS. 7A and 7B explain the margin of tilting control relating to the decrease in diffraction efficiency in the case where the hologram recording medium is tilted in the arrangement direction of two pixels allocated to 1 bit.
Figure 7B:
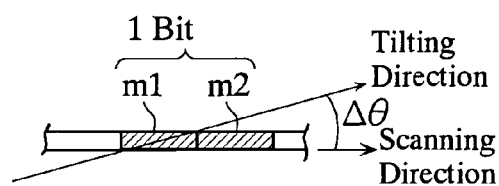
Figure 7B:
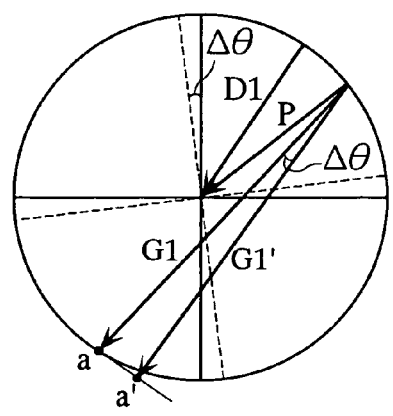
Figure 7B:
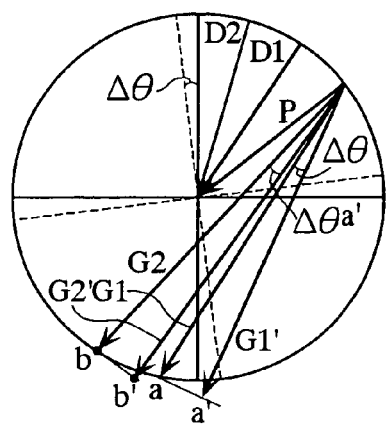

FIGS. 7A-7B illustrate the margin of tilting control relating to the decrease in diffraction efficiency in the case where the hologram recording medium is tilted in the arrangement direction of two pixels allocated to 1 bit; FIG. 7A relates to the case where two pixels separated by one pixel are allocated to 1 bit and FIG. 7B relates to the case where two adjacent pixels are allocated to 1 bit.

The circle in FIGS. 7A-7B is the frequency vector representation of the relationship between the reproduced beam, reference beam, and hologram recorded on the hologram recording medium. Axes of coordinate represented by solid lines inside the circles show the state in which the hologram recording medium was not tilted and axes of coordinate represented by dotted lines show the states in which the hologram recording medium was tilted at a microangle $\Delta\theta$. Furthermore, vectors D1, D2 represent the frequency vectors of the reproduction beam, and vector P represents the frequency vector of the reference beam, vectors G1, G2 represent the frequency vectors of the holograms obtained when the hologram recording medium was not tilted, and vectors G1', G2' represent the frequency vectors of the holograms obtained when the hologram recording medium was tilted.

When the hologram recording medium was not tilted, the distal ends of the frequency vectors G1, G2 of the hologram are positioned on the circumference of the circle (the state in a position with "0" shift of the characteristic shown in FIG. 19), the quantity of light of the reproduced beam assumes a maximum, and the recorded data can be reliably reproduced. On the other hand, if the hologram recording medium is tilted at a microangle $\Delta\theta$, the frequency vectors G1, G2 of the hologram rotate accordingly through the microangle $\Delta\theta$ in the rotation direction of the axes of coordinates and assumes the positions of frequency vectors G1', G2', respectively. Therefore, the distal ends a', b' of those frequency vectors G1', G2' come off the circumference of the circles. This state indicates the state shifted from the position with "0" shift of the characteristic shown in FIG. 19. As clearly follows from the characteristic shown in FIG. 19, the level of the reproduced beam sharply drops and the S/N ratio rapidly decreases.

Comparing FIGS. 7A and 7B, the angular range in which the distal ends a', b' of the vectors G1', G2' approach the circumference of the circle is larger in the case shown in FIG. 7B. Therefore, the margin of S/N in tilting control is more favorable in the case where two adjacent pixels were allocated to 1 bit than in the case where two pixels separated by one pixel were allocated to 1 bit. As a result, when the number of pixels per 1 bit in the recording pattern is increased, it is preferred that a plurality of adjacent pixels be allocated to 1 bit.

Figure 8:
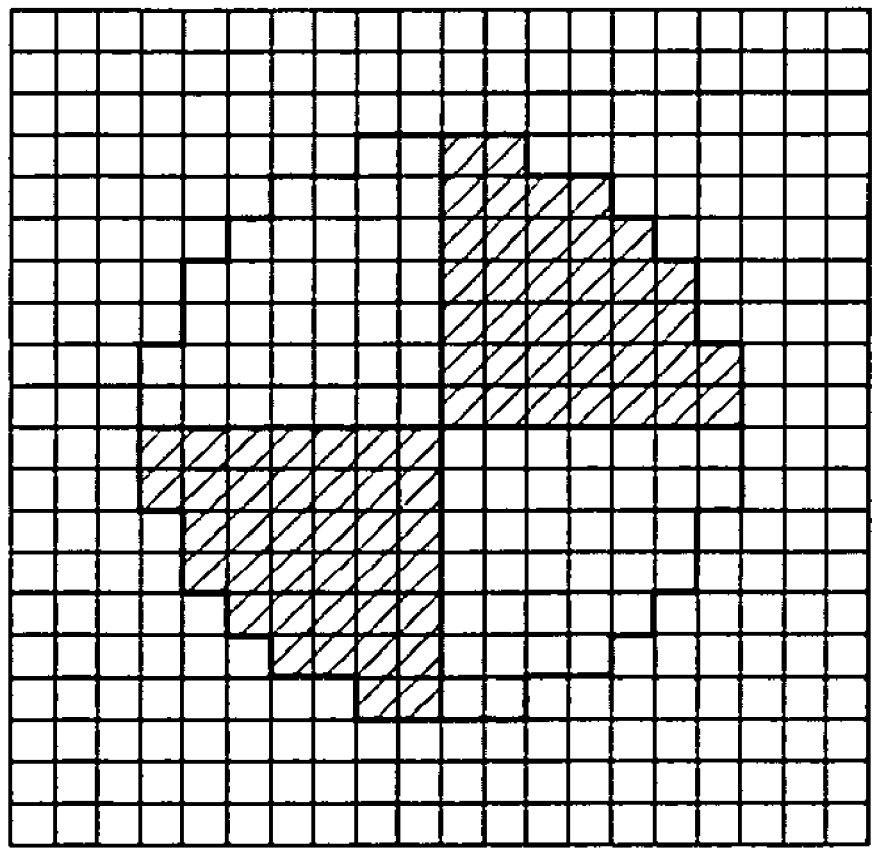
FIG. 8 illustrates an example of a special pattern employed for fine adjustment of servo pattern of focusing or tilting.

FIG. 8 illustrates an example of a special pattern employed for fine adjustment of servo pattern, for example, of focusing or tilting.

In the example shown in the figure, the division number of the recording area D on the reflecting surface of the spatial modulator 605 is reduced to a minimum and the margin of S/N per 1 bit is widened as much as possible. In this case, the recording area D was divided in for areas (top, bottom, left, right) and the areas were allocated to respective bits. Because the normal division number of the recording area D is "128", this division number was decreased at an apparent ratio of 1:32. The reduction ratio of the division number of the special pattern is not limited to the aforementioned value and can be set appropriately.

The control relating to pull-back of the servo control during reproduction in the hologram recording and reproduction device of the first embodiment will be described by using a flowchart shown in FIG. 9.

First, the spindle motor 4 is rotated at the prescribed rotation rate, the laser beam source 601 is caused to emit light, the hologram recording medium 2 is illuminated with a servo control beam, the reflected light thereof is detected with the light receiving element, and servo control of focusing and tracking is started with the focusing control circuit 8 and tracking control circuit 9 based on the servo information read from the servo information recording portion 2B of the hologram recording medium 2 from the detection circuit 11 by using the detection signal (S1). At this time, for example, all "0" data are inputted into the spatial modulator 605 and settings thereof are so made that the recording beam generated by the spatial modulator 605 does not fall on the hologram recording medium 2.

Then, a judgment relating to the present position of the pickup 6 in the hologram recording medium 2 is made based on the address information read from the address information portion 1A of the hologram recording medium 2 from the detection circuit 11 (S2).

The pickup 6 is then moved to the prescribed address position by the seek control circuit 10 based on the information on the prescribed address position where the data having the special pattern were recorded and the information on the present address position, and reading of the data having the special pattern recorded in the address position is conducted (S3). If the hologram recording layer 203 of the hologram recording medium 2 is illuminated with the reference beam after the pickup 6 has been moved to the prescribed address position, the reproduction beam is generated and this reproduction beam is picked by the pickup element 616, thereby conducting reading of the special data having the special pattern.

The received optical signal of each pixel outputted from the pickup element 616 is converted into digital data by the recording and reproduction signal processing circuit 12 and then inputted into the system controller 13. In recording and reproduction signal processing circuit 12, a table of a plurality of pixel positions allocated to each bit when the special data having the special pattern are reproduced has been stored in advance and the light reception level of pixel position corresponding to the aforementioned bit is added to each bit by using this table. For example, if each bit a1, a2, a3, a4 of 4-bit data (a1, a2, a3, a4) is assumed to be allocated to pixels g of each area on the top, bottom, left, and right, in the case of a special pattern shown in FIG. 8, then the light reception level of 32 pixels of the upper left area is added and a light reception level V1 of bit a1 is obtained. Further, the light reception level of 32 pixels of the lower left area is added and a light reception level V2 of bit a2 is obtained, the light reception level of 32 pixels of the upper right area is added and a light reception level V3 of bit a3 is obtained, and the light reception level of 32 pixels of the lower right area is added and a light reception level V4 of bit a4 is obtained.

Further, the recording and reproduction signal processing circuit 12 generates data of each bit of the 4-bit data based on the light reception levels V1 to V4. In the example shown in FIG. 8, 4-bit data (a1, a2, a3, a4)=(0, 1, 0, 1) are generated. The bit contents of the 4-bit data (a1, a2, a3, a4) and information of the light reception levels V1 to V4 of each bit are inputted into the system controller 13.

Then, fine adjustment of tilting of the scanning direction (rotation direction of the hologram recording medium 2) of the pickup 6 with respect to the hologram recording medium 2 is conducted by finely displacing the reflection direction of the reflecting mirror by using the light reception levels V1 to V4 of each bit 4-bit data (a1, a2, a3, a4) (S4). Thus, the system controller 13 adds the light reception levels V1, V2 of bits a1, a2 (a sum of light reception levels on the areas on the left side of the special pattern in FIG. 8), adds the light reception levels V3, V4 of bits a3, a4 (a sum of light reception levels on the areas on the right side of the special pattern in FIG. 8), computes the differential data for the two, and computes the tilting direction and adjustment quantity thereof from the differential data.

Figure 10A:
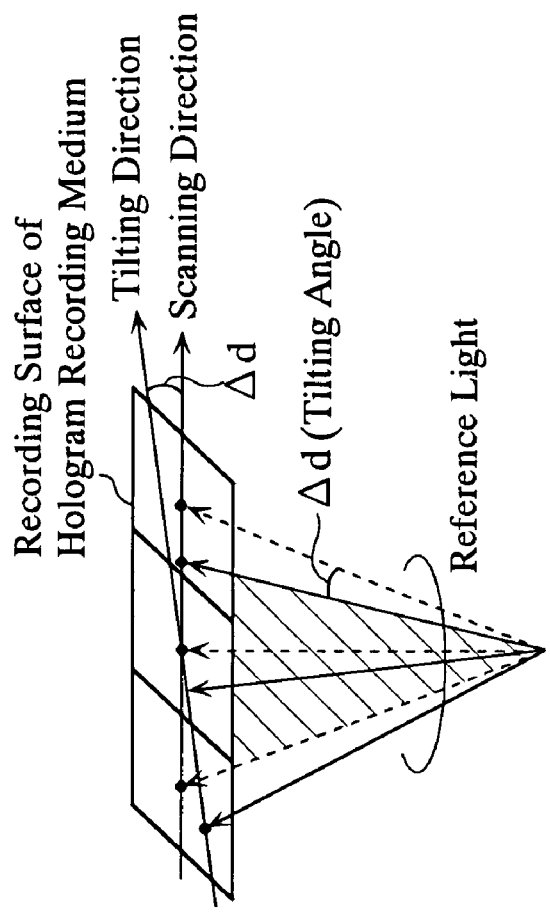
FIGS. 10A and 10B explain a method for finely adjusting the tilting in the case where the hologram recording medium is tilted in the scanning direction of the pickup.
Figure 10B:
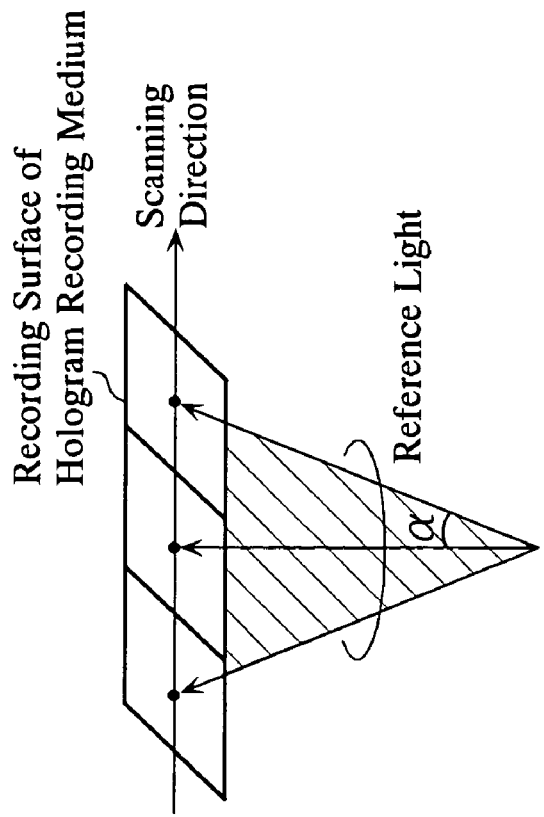

FIGS. 10A-10B explain a method for finely adjusting the tilting in the case where the hologram recording medium 2 is tilted in the scanning direction of the pickup 6; FIG. 10A shows a state without tilting and FIG. 10B shows a tilted state. FIG. 10B shows a tilted state of the hologram recording medium 2 by tilting the reflection direction of the reference beam with the hologram recording medium 2 as a standard. Furthermore, the reference beam level shown by a dotted line in FIG. 10B illustrates the case where the hologram recording medium 2 was not tilted, and the reference beam level shown by a solid line illustrates the case where the hologram recording medium 2 was tilted.

When the hologram recording medium 2 was not tilted in the scanning direction of the pickup 6, the optical axis of the reference beam, as shown in FIG. 10A, is almost perpendicular to the hologram recording medium 2. Therefore, the pixels arranged in the scanning direction of the hologram recording medium 2 are illuminated with the reference beam almost symmetrically with respect to the optical axis as a center. For this reason, when the special pattern shown in FIG. 8 is read by scanning the special pattern in the transverse direction from left to right, the left-side area and right-side area are illuminated almost uniformly with the reference beam (see the hatched zone in FIG. 10A) and the sum SUM1 (light reception level of the left-side area of the special pattern) of the light reception levels V1, V2 of the bits a1, a2 is almost equal to the sum SUM2 (light reception level of the right-side area of the special pattern) of the light reception levels V3, V4 of the bits a3, a4.

On the other hand, as shown in FIG. 10B, when the hologram recording medium 2 is tilted at a tilting angle $\Delta\alpha$ downward with respect to the scanning direction, the optical axis of the reference beam is relatively tilted in the scanning direction with respect to the hologram recording medium 2 (see the reference beam vector shown by a solid line in FIG. 10B). Therefore, the balance of the quantity of light of the reference beam illuminating the right-side area and left-side area of the special pattern shown in FIG. 8 is disrupted (see the hatched zone in FIG. 10B), and the light quantity on the left-side area is larger than that on the right-side area.

Therefore, the SUM2 of the light reception levels V3, V4 of the bits a3, a4 becomes larger than the sum SUM1 of the light reception levels V1, V2 of the bits a1, a2, and because the difference between them is proportional to the tilting degree of the hologram recording medium 2, the system controller 13 judges the tilting direction and quantity of tilting of the hologram recording medium 2 in the scanning direction by computing the differential data of the SUM 1 and SUM 2, generating the control data for correcting this quantity of tilting, and inputting this data into the pickup 6. In the pickup 6, the angle of incidence of the reference beam on the hologram recording medium 2 is finely varied and fine adjustment of tilting is conducted by finely varying the tilting angle of the reflecting mirror 616 based on the control data.

In the present embodiment, only fine adjustment of tilting relating to tilting of the hologram recording medium 2 in the scanning direction of the pickup 6 was conducted, but fine adjustment of tilting relating to tilting in the direction perpendicular to the scanning direction of the pickup 6 can be also conducted by a similar method by using the special pattern.

Figures 11A, 11B, 11C:
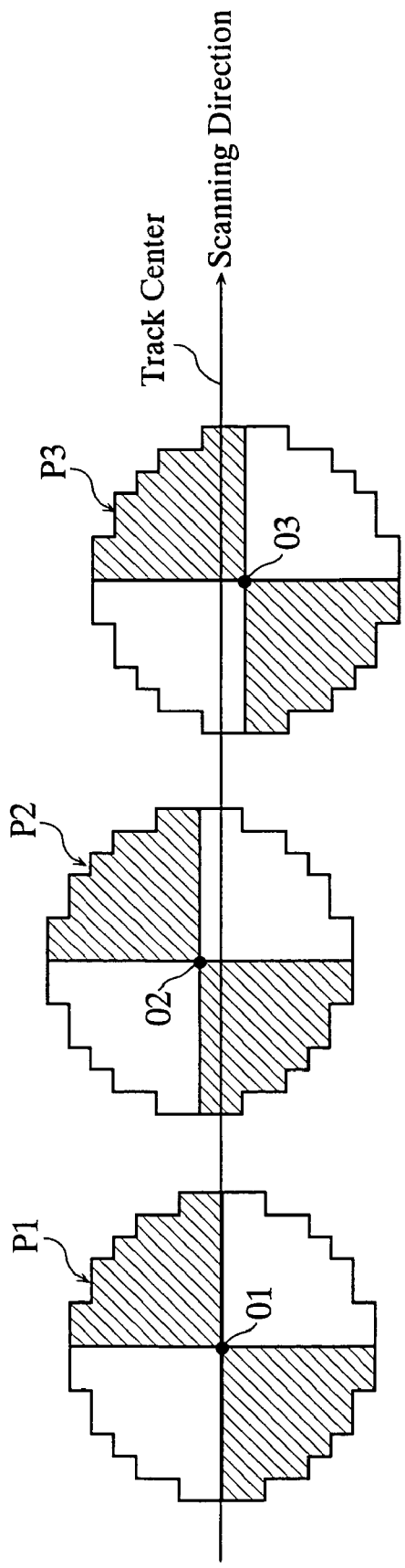
FIGS. 11A-11C show examples of the special pattern to be recorded on the hologram recording medium for controlling the tilting of the hologram recording medium in the direction perpendicular to the scanning direction.
Figure 12:
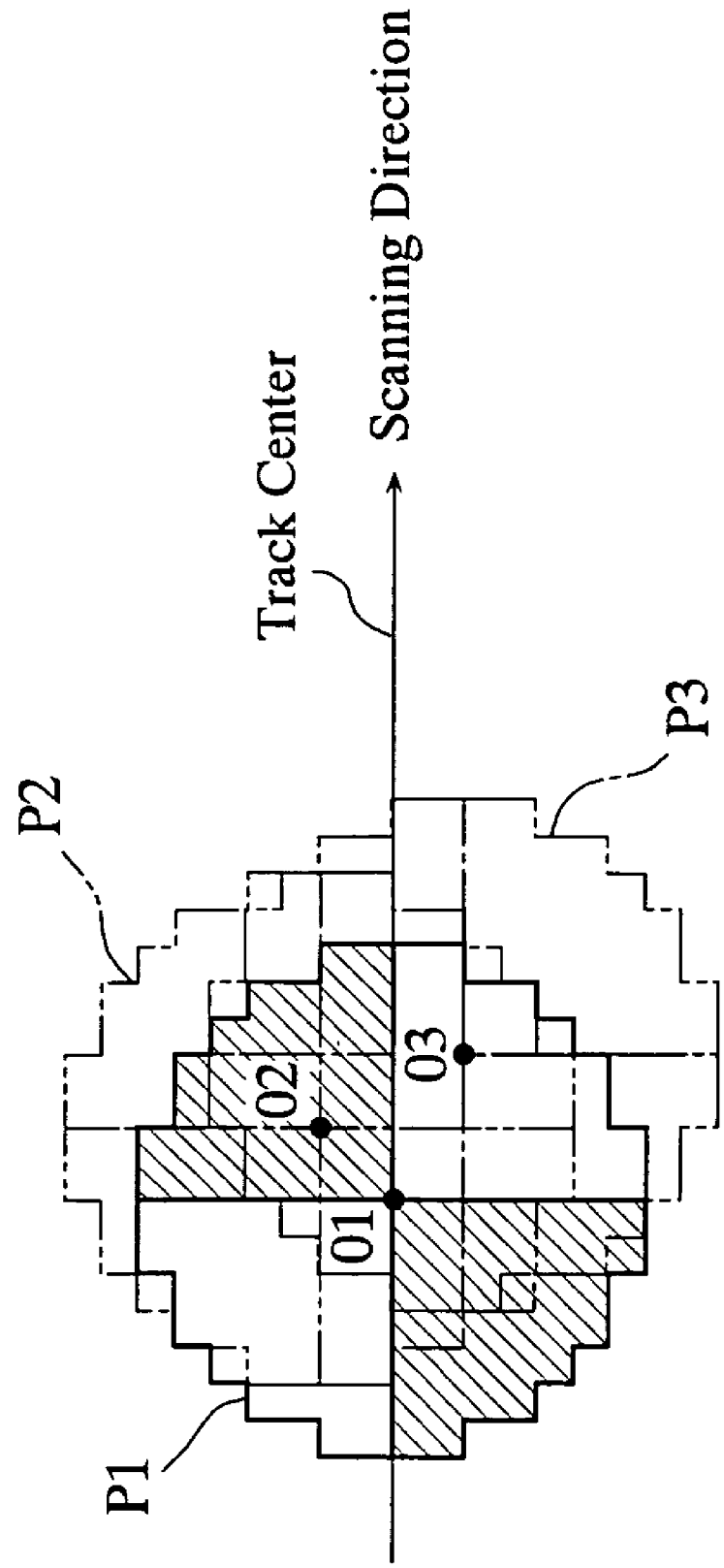
FIG. 12 shows another example of the special pattern to be recorded on the hologram recording medium for controlling the tilting of the hologram recording medium in the direction perpendicular to the scanning direction.

In this case, as shown in FIGS. 11A-11C, in addition to the special pattern shown in FIG. 8, a second special pattern of the same shape having the central point thereof displaced through the prescribed number of pixels (in FIG. 11B, one pixel) to the left with respect to the scanning direction of the track and a third special pattern having the central point thereof displaced through the prescribed number of pixels (in FIG. 11(c), one pixel) to the right with respect to the scanning direction of the track are arranged in a row along the scanning direction of the pickup 6 of the hologram recording medium 2 and recorded, or the patterns are overlapped, as shown in FIG. 12, in the same position with a shift of central positions thereof and recorded, and the second and third special patterns displaced from the track are read.

Then, the tilting quantity and tilting direction of the perpendicular direction of the hologram recording medium 2 with respect to the scanning direction can be judged by adding up the received optical signals of each pixel for which the second special pattern was read, adding up the received optical signals of each pixel for which the third special pattern was read, and calculating the difference between the sums SUMa, SUMb. Therefore, fine adjustment of tilting can be conducted by the method identical to the above-described method by generating the control data from the differential data of those sums SUMa, SUMb and inputting them into the pickup 6.

Fine adjustment of focusing is then conducted (S5). In this fine adjustment, the system controller 13 monitors the sum SUM3 obtained by adding up the light reception levels V1 to V4 of four-bit data (a1, a2, a3, a4) obtained by reading the special pattern inputted from the recording and reproduction signal processing circuit 12, while finely varying the unit 620 of the first and second objective lenses 610, 614 in the focusing control circuit 8. The position of unit 620 is then finely adjusted into the position in which this sum SUM3 reaches maximum.

Fine adjustment of the wavelength of the laser beam source 601 is then conducted (S6). This fine adjustment is conducted similarly to the fine adjustment of focusing. Thus, the system controller 13 monitors the sum SUM3 obtained by adding up the light reception levels V1 to V4 of four-bit data (a1, a2, a3, a4) obtained by reading the special pattern inputted form the recording and reproduction signal processing circuit 12, while finely varying the wavelength of the laser light source 601. The wavelength of the laser light source 601 is then finely adjusted into the position in which this sum SUM3 reaches maximum.

If the relative displacement of the incident reference beam with respect to the hologram recording medium 2 is adjusted into the allowed range by the fine adjustment of tilting and focusing conducted in steps S4, S5 and the shift of the wavelength of the light source is adjusted into the allowed range by the fine adjustment of the wavelength of the laser beam source 601 conducted in step S6, then in this state the hologram recording medium 2 can be read with sufficient stability. Therefore, the read operation of the recorded data is thereafter conducted by moving the pickup 6 to the designated address position (S7).

The explanation provided hereinabove related to reproduction, but processing of steps S1 to S6 can be employed in the same manner in the case of recording.

As described hereinabove, with the hologram recording and reproduction device of the first embodiment, the prescribed data having a special pattern are recorded on the hologram recording medium 2 by increasing the number of pixels per 1 bit and generating a recording optical image, the data having the special pattern are read when this hologram recording medium 2 is recorded and reproduced, and fine adjustment of tilting, focusing, and wavelength of the laser beam source is conducted by using the received optical signals relating to each bit of the data. Therefore, the shift of the angle of incidence of the reference beam or the shift of the wavelength of the light source can be reliably corrected and stable recording and reproduction of data can be conducted even when the hologram recording medium 2 is composed of a disk-type replaceable recording medium.

The hologram recording and reproduction device of the second embodiment will be described below.

Figure 13:
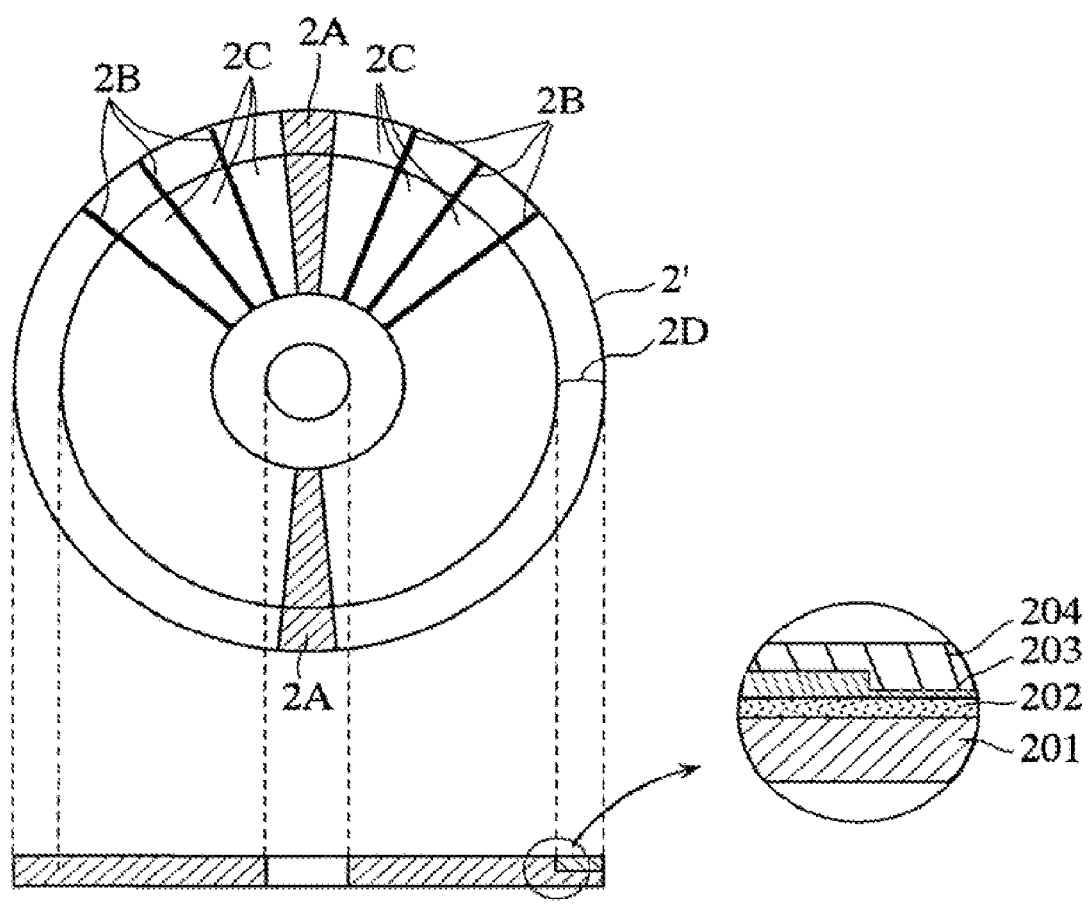
FIG. 13 shows the structure of the hologram recording medium employed in the hologram recording and reproduction device of the second embodiment.

The difference between the hologram recording and reproduction device of the second embodiment and the hologram recording and reproduction device of the first embodiment is in that a hologram recording medium 2' shown in FIG. 13 is used.

In the hologram recording medium 2' shown in FIG. 13, the thickness of a hologram recording layer 203 located on the outer periphery of the disk in the hologram recording medium 2 shown in FIG. 3 is about half that of the portions on the inner side thereof. This area 15 with decreased thickness is considered as an area 2D (referred to as the special zone hereinbelow) for recording the data necessary for recording and reproducing the recording data such as directories or management data. Special data having the above-described special patterns for conducting fine adjustment of tilting and focusing or fine adjustment of the wavelength of the data light source are also recorded in this special zone 2D.

In hologram recording, the margin of the characteristic of the intensity of the diffraction beam shown in FIG. 19 is known to be inversely proportional to the thickness of the hologram recording medium. In the hologram recording medium 2' of the second embodiment, the margin of the shift of the angle of incidence of the reference beam in the special zone 2D or the shift of the wavelength of the light source are made by a factor of about two larger than those in the other areas by reducing the thickness of the hologram recording layer 203 in the special zone 2D to about half that of the hologram recording layer 203 in the areas other than the special zone 2D.

If the thickness of the hologram recording layer 203 of the hologram recording medium 2' in the areas other than the special zone 2D is increased as much as allowed by the margin of the shift of the angle of incidence of the reference beam or the shift of the wavelength of the light source, then there is a risk that directory data or management data of recorded data that are important from the standpoint of recorded data will be impossible to read with good stability and reliability. However, with the hologram recording and reproduction device of the second embodiment, recording and reproduction of the management data or directory is recorded with good stability and reliability by recording the recording area of the management data and directories in the special zone of the hologram recording medium 2'. Furthermore, because data having a special pattern for conducting fine adjustment of tilting and focusing and fine adjustment of the wavelength of the data light source are recorded in the special zone 2D, the margin of S/N per 1 bit during reading of this special pattern is further widened and introduction of servo control of tilting and focusing is conducted with higher stability.

Control of recording and reproduction in the hologram recording and reproduction device of the second embodiment will be explained below by using a flowchart shown in FIG. 14. In this explanation of control, a system will be described in which a host computer is connected via an interface to the hologram recording and reproduction device.

Figure 9:
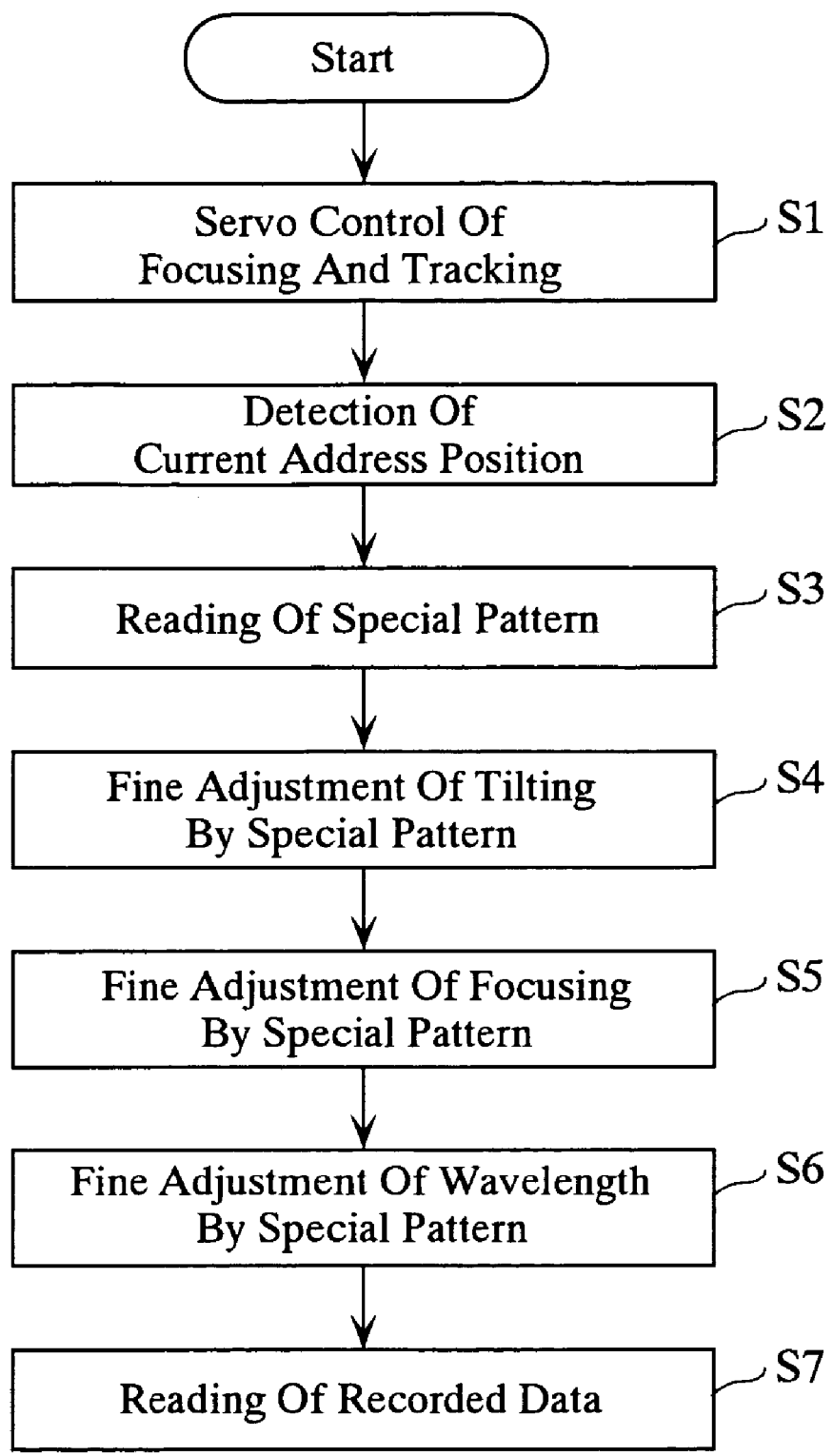
FIG. 9 is a flowchart illustrating control of pull-back of the servo control during reproduction in the hologram recording and reproduction device of the first embodiment.
Figure 14:
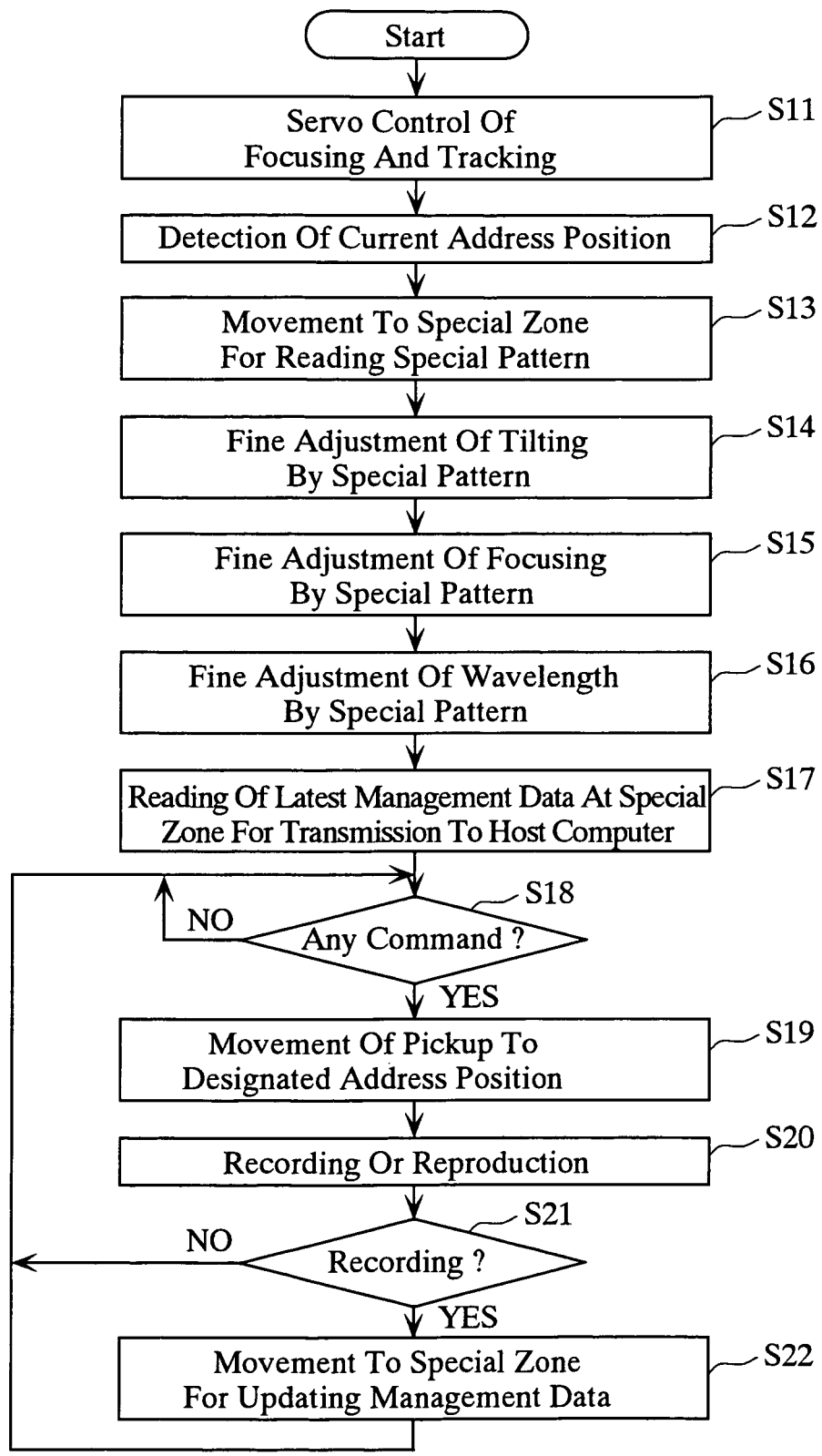
FIG. 14 is a flowchart illustrating control of recording and reproduction in the hologram recording and reproduction device of the second embodiment.

In the flowchart shown in FIG. 14, the processing of steps S11 to S16 is basically identical to that of steps S1 to S6 of the flowchart shown in FIG. 9. For this reason, the explanation of processing of those steps is omitted and only step 17 and subsequent steps will be explained below. The second embodiment differs in that the data having a special pattern are recorded in the special zone 2D, as described hereinabove.

Therefore, if the present position of the pickup 6 at the hologram recording medium 2 is judged in step S12, then in step S13 the pickup 6 is moved to the special zone 2D with the seek control circuit 10 and reading of data having the special pattern recorded in the special zone 2D is conducted.

If the relative displacement of the reference beam with respect to the incidence beam falling on the hologram recording medium 2 is adjusted into the allowed range by the fine adjustment of tilting and focusing and the shift of the wavelength of the light source is adjusted into the allowed range by the fine adjustment of the wavelength of the laser beam source 601 by the processing of steps S11 to S16, then the newest directory or management data recorded in the special zone 2D is read, this information is transmitted to the host computer (S17), and a state of waiting a command from the host computer is assumed (S18).

If a recording or reproduction command is then received from the host computer (S18: YES), the pickup 6 is moved to the designated address position by the seek control circuit 10 (S19) and the designated recording or reproduction processing is conducted (S20).

When the command is "reproduction" (S21: NO), the processing flow moves to step S18, and when the command is "recording" (S21: YES), the pickup 6 is moved to the special zone 2D by the seek control circuit 10, the recording processing for updating the directories or management data recorded in the special zone 2D is conducted (S22) and then the processing flow moves to step S18. The transition to step S18 also may be made after conducting verification processing of the data updating the directory or management data of the special zone 2D or newly recorded data after completing the processing of step S22.

The hologram recording and reproduction device of the third embodiment will be explained below.

The hologram recording and reproduction device of the third embodiment employs a method of increasing the number of pixels per 1 bit to the management data and increases the reliability of reproducing the management data, which are more important then the usual recording data.

In the example explained below, the hologram recording and reproduction device of the third embodiment uses the hologram recording medium 2' shown in FIG. 13, but the hologram recording medium 2 shown in FIG. 3 may also be used.

Figure 15:
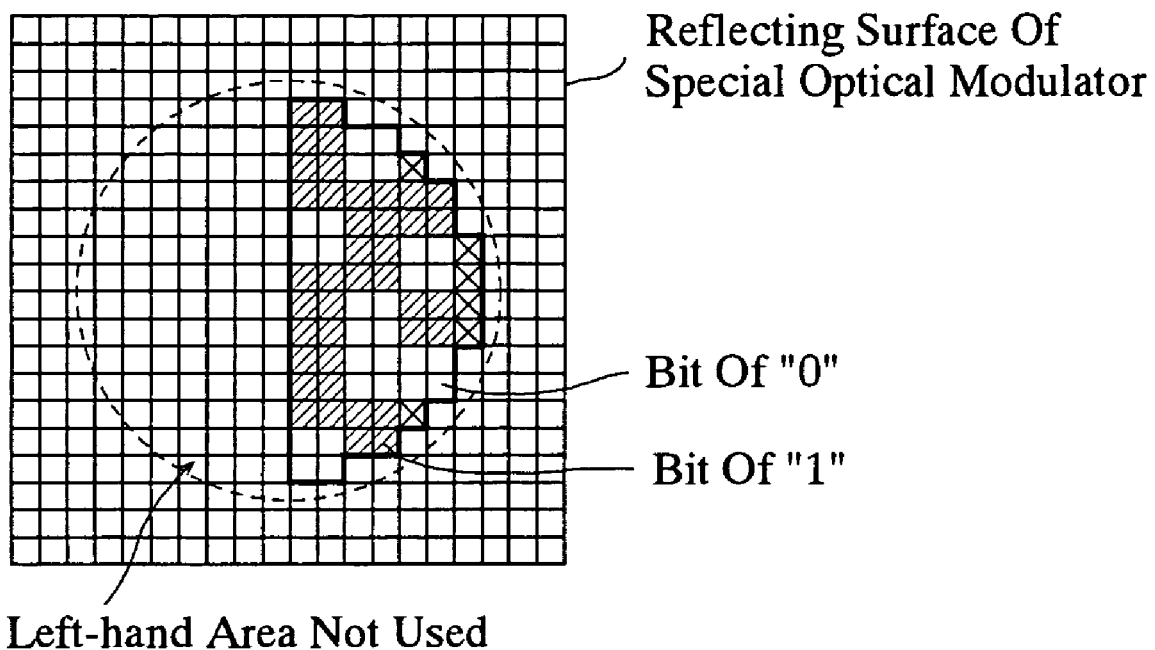
FIG. 15 shows an example of the recording pattern of management data recorded and reproduced in the hologram recording and reproduction device of the third embodiment.

FIG. 15 shows an example of the recording pattern of management data recorded and reproduced in the hologram recording and reproduction device of the third embodiment.

The recording pattern of the management data shown in the same figure is obtained by using only the right-side area in the method of allocating four pixels per 1 bit shown in FIG. 6 and conducting optical modulation with the spatial modulator 605. Because only right half of the recording area D of the conversion modulator 605 is used and 1 bit is recorded in four-pixel units, the recording capacity per one page becomes at least ⅛ that of the usual recording data. Therefore, the management data can be recorded upon dividing into a plurality of pages by the angular multiplexing method.

Because the management data associates four pixels with one bit, the margin of S/N per 1 bit increases, as was described above, with respect to that of the usual recording data. Furthermore, using only the right-side area of the recording area D on the reflecting side of the spatial modulator 605 can be explained as follows.

Figure 16:
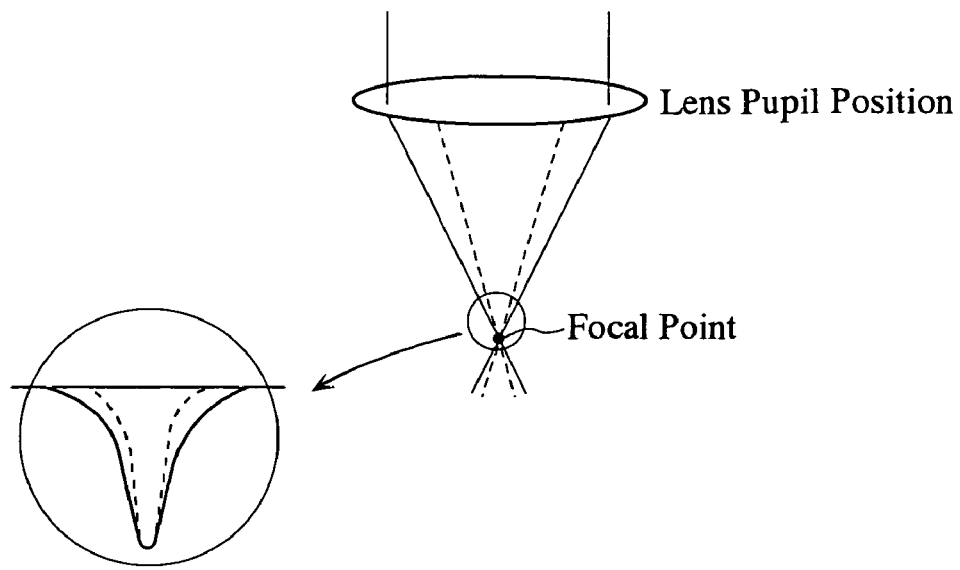
FIG. 16 shows the relationship between the equivalent NA and the size of the Fourier transformed image in the vicinity of the focal point.

Thus, in the hologram recording and reproduction device of the third embodiment, the first objective lens 610 for converging the recording light is so disposed that the hologram recording layer 203 of the hologram recording medium 2 is located in a position corresponding to a state in which the recording light is not Fourier transformed, for example, in a Fresnel position. With such an arrangement, if the surface area of the recording beam is reduced, then a state is assumed in which the NA (Numerical Aperture) equivalently decreases, as shown in FIG. 16. Therefore, on the image plane, the surface area is instead expanded. In the defocused position, which is considered not Fourier transformed, the surface area expansion is conversely small and when the data is recorded in the scanning direction of the pickup 6 on the hologram recording medium 2, the reduction of surface area of the recording beam allows for higher multiplexing. For this reason, in the example shown in FIG. 15, only the right half of the recording area D is used for scanning from left to right and the surface area of the recording pattern optically modulated with the spatial modulator 605 is reduced with respect to that of the recording pattern of the usual recording data.

Further, despite such a reduction in the surface area of the recording light, the margin of S/N per 1 bit is still widened with respect to that in the case of the usual recording data and the effect of increased reliability of management data reading is not lost.

Figure 17:
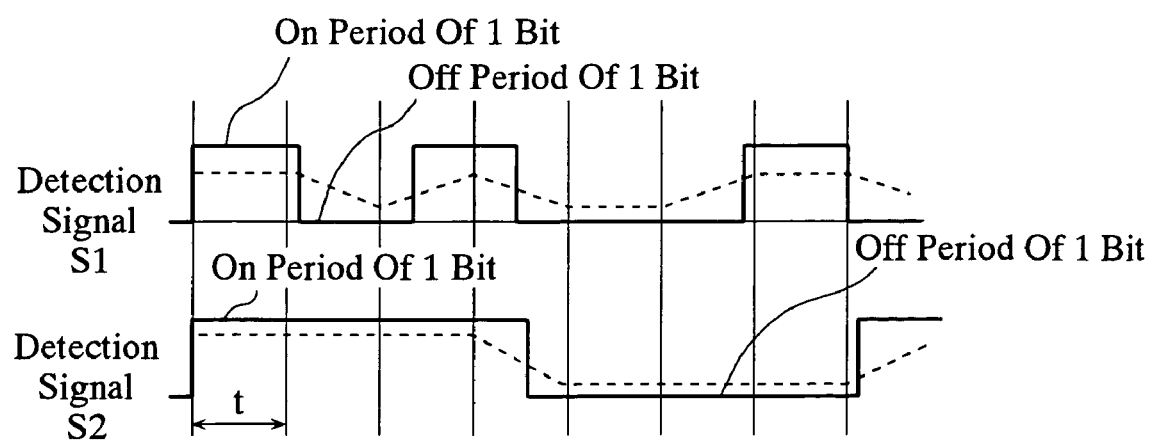
FIG. 17 shows an example of a signal waveform in the case where the detected signal of the reproduced light is subjected to fitting processing.

Further, in the present embodiment, 4 adjacent pixels are allocated to 1 bit when the reproduction beam of management data is detected. Therefore, the detected signal corresponding to 1 bit can be considered as a signal in which the received optical signals of 4 allocated pixels are connected. Thus, as shown in FIG. 17, the ON period or OFF period of the signal indicating 1 bit is longer than that of the reproduction beam of the usual recording data. For this reason, when a fitting approach is employed, the residuals are larger and fitting is more difficult when the waveform variation period is short, provided that the fitting resolution is the same. Therefore, from this standpoint, too, it is advantageous to record the management data by conducting optical modulation by the method associating a plurality of adjacent pixels with 1 bit.

Further, in FIG. 17, the waveform of the upper detection signal S1 is the detection signal waveform of the reproduction beam in the case where the management data were modulated by the usual optical modulation method, that is, by the same method as the recording data, and the waveform of the lower detection signal is the detection signal waveform of the reproduction beam in the case where the management data were modulated by the recording pattern shown in FIG. 15. As shown in the figure, The ON period Ton or OFF period Toff corresponding to 1 bit of the lower detection signal S2 is four times that of the upper detection signal. Furthermore, in FIG. 17, the period t is a fitting period, and the waveform shown by a dotted line is a signal waveform detected by the fitting processing.

Control of recording and reproduction in the hologram recording and reproduction device of the third embodiment will be explained below by using the flowchart shown in FIG. 18. In this explanation of control, the case will be described where a host computer is connected via an interface to the hologram recording and reproduction device and a recording command is transmitted from the host computer to the hologram recording and reproduction device. Further, the data having the special pattern for finely adjusting the servo control of tilting and focusing is considered to be recorded in the special zone 2D.

Figure 18:
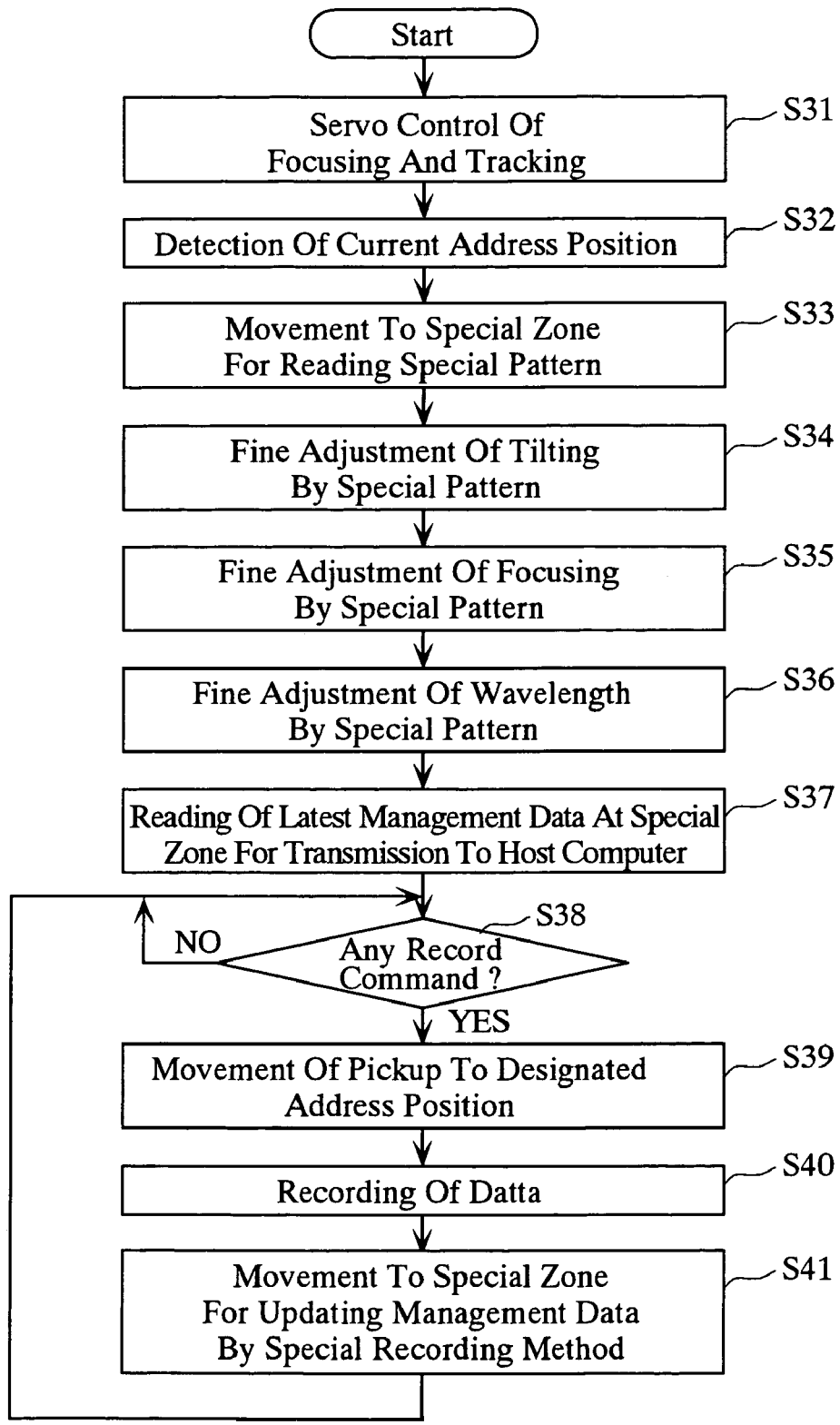
FIG. 18 is a flowchart illustrating control of recording and reproduction in the hologram recording and reproduction device of the third embodiment.

In the flowchart shown in FIG. 18, the processing of steps S31 to S36 is basically identical to that of steps S11 to S16 of the flowchart shown in FIG. 16. For this reason, the explanation of processing of those steps is omitted and only step 37 and subsequent steps will be explained below.

If the relative displacement of the incident reference beam with respect to the hologram recording medium 2 is adjusted into the allowed range by the fine adjustment of tilting and focusing and the shift of the wavelength of the light source 601 is adjusted into the allowed range by the fine adjustment of the wavelength of the laser beam source 601 by the processing of steps S31 to S36, then the newest directory or management data recorded in the special zone 2D is read, this information is transmitted to the host computer (S37), and a state of waiting a command from the host computer is assumed (S38).

If a recording command is then received from the host computer (S38:YES), the pickup 6 is moved to the designated address position by the seek control circuit 10 (S39) and the recording data transmitted from the host computer is recorded on the hologram recording medium 2 by the usual optical modulation method (the optical modulation method in which one micromirror m of the spatial modulator 605 is associated with 1 bit) (S40). Then, the pickup 6 is moved to the prescribed address position (the prescribed address position for recording the management information such as FAT) by the seek control circuit 10, recording processing for updating the directory or management data recorded in this address position is conducted (S41) and the processing flow them returns to step S38. Further, the recording processing in this case is conducted by optically modulating the management data with a special optical modulation method, allocating a plurality of pixels to one bit and recording them on the hologram recording medium 2.

Further, the return to step S38 may be also made after conducting verification processing of the data updating the directory or management data of the special zone 2D or newly recorded data after completing the processing of step S41.

In the third embodiment, the number of a plurality of pixels allocated to 1 bit during management data recording was fixed to a preset value, but it may be also changed by external operations by the user or by a command from the host computer. Further, in the third embodiment, the optical modulation method allocating a plurality of pixels to 1 bit was employed only with respect to the management data, but it may be also employed for recording the recording data.

As descried hereinabove, with the hologram recording and reproduction device of the third embodiment, the management data, which are more important to process by recording and reproduction than the recording data, are recorded on the hologram recording medium after optical modulation to a pattern that widens the margin of S/N per 1 bit. Therefore, recording and reproduction of the management data can be conducted reliably.

In the above-described first to third embodiments, the examples were explained in which a reflection-type DMD was used as the optical system of pickup for the spatial modulator, but a transmission-type liquid-crystal panel may be also used for the spatial modulator.

The invention claimed is:

1. A hologram recording medium detachably mountable on a hologram recording and reproduction device, the recording medium comprising:
 a first recording area having a relatively thin hologram recording layer; and
 a second recording area having a relatively thick hologram recording layer;
 wherein the first recording area is provided with management data for controlling data recording and reproduction operation of the hologram recording and reproduction device.

* * * * *